(12) United States Patent
Chae et al.

(10) Patent No.: US 10,807,533 B2
(45) Date of Patent: Oct. 20, 2020

(54) DRIVER ASSISTANCE APPARATUS AND VEHICLE HAVING THE SAME

(71) Applicant: LG ELECTRONICS INC., Seoul (KR)

(72) Inventors: Kyuyeol Chae, Seoul (KR); Kwon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/316,948

(22) PCT Filed: Oct. 13, 2016

(86) PCT No.: PCT/KR2016/011445
§ 371 (c)(1),
(2) Date: Jan. 10, 2019

(87) PCT Pub. No.: WO2018/012674
PCT Pub. Date: Jan. 18, 2018

(65) Prior Publication Data
US 2019/0291642 A1 Sep. 26, 2019

(30) Foreign Application Priority Data
Jul. 11, 2016 (KR) .......................... 10-2016-0087502

(51) Int. Cl.
*B60R 1/00* (2006.01)
*G06T 7/30* (2017.01)
(Continued)

(52) U.S. Cl.
CPC .............. *B60R 1/00* (2013.01); *B60W 40/02* (2013.01); *B60W 50/14* (2013.01);
(Continued)

(58) Field of Classification Search
CPC ............... B60R 1/00; B60R 2300/607; B60R 2300/303; B60R 2300/105;
(Continued)

(56) References Cited

U.S. PATENT DOCUMENTS 5,670,935 A * 9/1997 Schofield ............... B60N 2/002
340/461
7,561,181 B2 * 7/2009 Schofield .................. B60R 1/00
348/113
(Continued)

FOREIGN PATENT DOCUMENTS

JP 10-232936 A 9/1998
JP 2012-138876 A 7/2012

*Primary Examiner* — An T Nguyen
(74) *Attorney, Agent, or Firm* — Birch, Stewart, Kolasch & Birch, LLP

(57) ABSTRACT

A driver assistance apparatus according to an embodiment of the present invention includes: a first camera configured to capture a first video of the vicinity of a vehicle; a second camera configured to capture a second video of the vicinity of the vehicle; a processor configured to extract a first edge of an object included in a first stitching region in which the first video and the second video of the vicinity of the vehicle are connected; and a display unit configured to overlap and display the first edge and a synthetic video of the first and second videos of the vicinity of the vehicle except for the first stitching region, wherein the first stitching region is a fixed region included in the first video and the second video of the vicinity of the vehicle.

16 Claims, 30 Drawing Sheets

(51) Int. Cl.
<table>
<tr><td>G06K 9/00</td><td>(2006.01)</td></tr>
<tr><td>B60W 40/02</td><td>(2006.01)</td></tr>
<tr><td>B60W 50/14</td><td>(2020.01)</td></tr>
<tr><td>H04N 5/265</td><td>(2006.01)</td></tr>
<tr><td>H04N 5/232</td><td>(2006.01)</td></tr>
</table>

(52) U.S. Cl.
CPC ............ *G06K 9/00791* (2013.01); *G06T 7/30* (2017.01); *H04N 5/23238* (2013.01); *H04N 5/265* (2013.01); *B60R 2300/105* (2013.01); *B60R 2300/303* (2013.01); *B60R 2300/607* (2013.01); *G06T 2207/10016* (2013.01); *G06T 2207/30252* (2013.01)

(58) Field of Classification Search
CPC .. H04N 5/23238; H04N 5/265; H04N 5/2257; B60W 50/14; B60W 40/02; B60W 2050/146; B60W 2420/42; B60W 2550/30; B60W 2550/10; G06K 9/00791; G06T 7/30; G06T 2207/30252; G06T 2207/10016

See application file for complete search history.

(56) References Cited

U.S. PATENT DOCUMENTS

| | | | | |
|---|---|---|---|---|
| 8,150,210 B2* | 4/2012 | Chen | ............. | G06T 3/4038 340/937 |
| 8,462,204 B2* | 6/2013 | Schofield | ............. | B60R 1/00 348/113 |
| 9,769,381 B2* | 9/2017 | Lu | ............. | B32B 17/10651 |
| 10,230,900 B2* | 3/2019 | Choi | ............. | G06K 9/4661 |
| 2002/0167589 A1* | 11/2002 | Schofield | ............. | B60N 2/002 348/148 |
| 2003/0103683 A1* | 6/2003 | Horie | ............. | G06T 7/30 382/284 |
| 2003/0122930 A1* | 7/2003 | Schofield | ............. | B60R 1/00 348/148 |
| 2008/0046150 A1* | 2/2008 | Breed | ............. | B60R 21/0134 701/45 |
| 2008/0198226 A1 | 8/2008 | Imamura | | |
| 2010/0020170 A1* | 1/2010 | Higgins-Luthman | ............. | H04N 5/2256 348/135 |
| 2010/0194851 A1* | 8/2010 | Pasupaleti | ............. | G06T 3/4038 348/36 |
| 2012/0170812 A1* | 7/2012 | Kamiyama | ............. | B60R 1/00 382/103 |
| 2012/0249399 A1 | 10/2012 | Sato | | |
| 2014/0063064 A1 | 3/2014 | Seo et al. | | |
| 2014/0074356 A1* | 3/2014 | Bone | ............. | G08G 1/167 701/41 |
| 2014/0240452 A1* | 8/2014 | Ki | ............. | H04N 5/23238 348/38 |
| 2014/0247352 A1 | 9/2014 | Rathi et al. | | |
| 2015/0109444 A1* | 4/2015 | Zhang | ............. | B60Q 9/008 348/148 |
| 2015/0127217 A1* | 5/2015 | Lee | ............. | B60W 30/06 701/36 |
| 2016/0001776 A1* | 1/2016 | Kim | ............. | B60W 30/16 701/96 |
| 2016/0063705 A1* | 3/2016 | Xu | ............. | G06T 5/50 382/199 |
| 2016/0159281 A1* | 6/2016 | Jang | ............. | B60R 1/06 348/148 |
| 2016/0165148 A1 | 6/2016 | Itoh et al. | | |
| 2016/0217625 A1* | 7/2016 | Oba | ............. | G06T 3/4038 |
| 2016/0314365 A1* | 10/2016 | Poledna | ............. | G06K 9/00805 |
| 2016/0350606 A1* | 12/2016 | Yoshitomi | ............. | G06K 9/00818 |
| 2016/0360104 A1* | 12/2016 | Zhang | ............. | H04N 13/239 |
| 2017/0192091 A1* | 7/2017 | Felix | ............. | G01S 13/42 |
| 2017/0280063 A1* | 9/2017 | Jeon | ............. | H04N 5/23238 |
| 2017/0287168 A1* | 10/2017 | Jeong | ............. | B60K 35/00 |
| 2018/0015918 A1* | 1/2018 | Bae | ............. | B60W 50/14 |
| 2018/0052458 A1* | 2/2018 | Tsuji | ............. | G05D 1/021 |
| 2018/0056871 A1* | 3/2018 | Karner | ............. | B29C 45/1671 |
| 2018/0065552 A1* | 3/2018 | Mori | ............. | B60R 1/00 |
| 2018/0137339 A1* | 5/2018 | Osato | ............. | B60R 21/00 |
| 2018/0309962 A1* | 10/2018 | Shimizu | ............. | H04N 5/2628 |
| 2018/0322347 A1* | 11/2018 | Friebe | ............. | G06T 7/60 |
| 2019/0205662 A1* | 7/2019 | Samal | ............. | G03B 7/28 |
| 2019/0291642 A1* | 9/2019 | Chae | ............. | G06K 9/00805 |

\* cited by examiner

[Fig. 1]
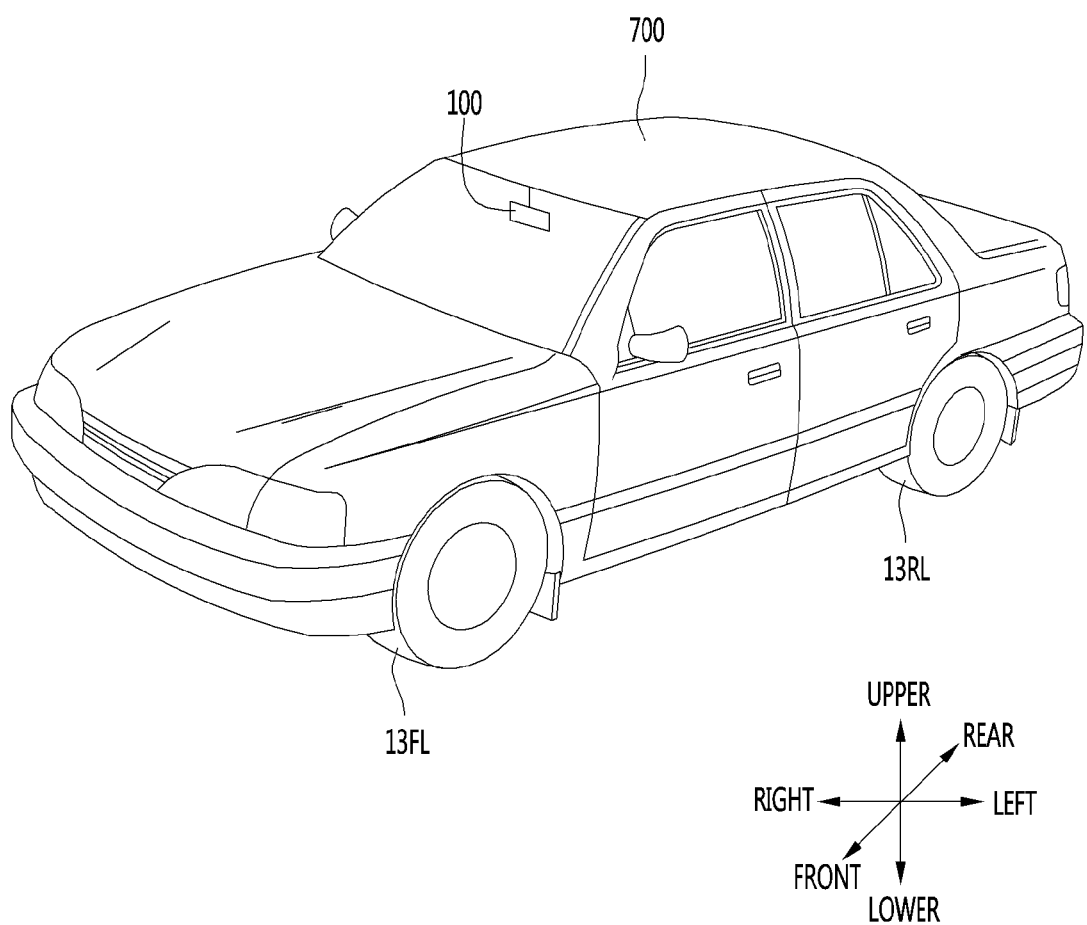

[Fig. 2]
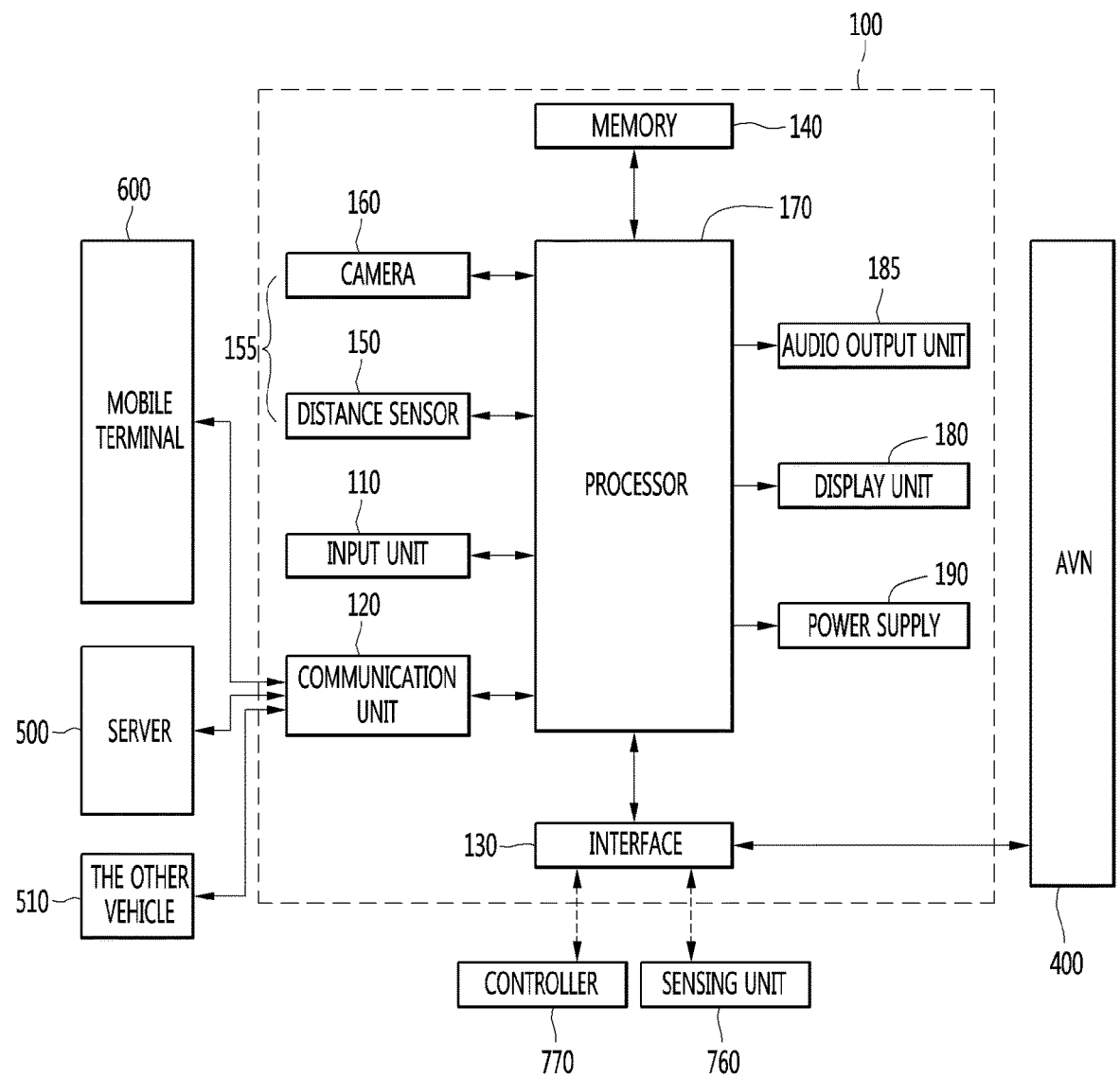

[Fig. 3]
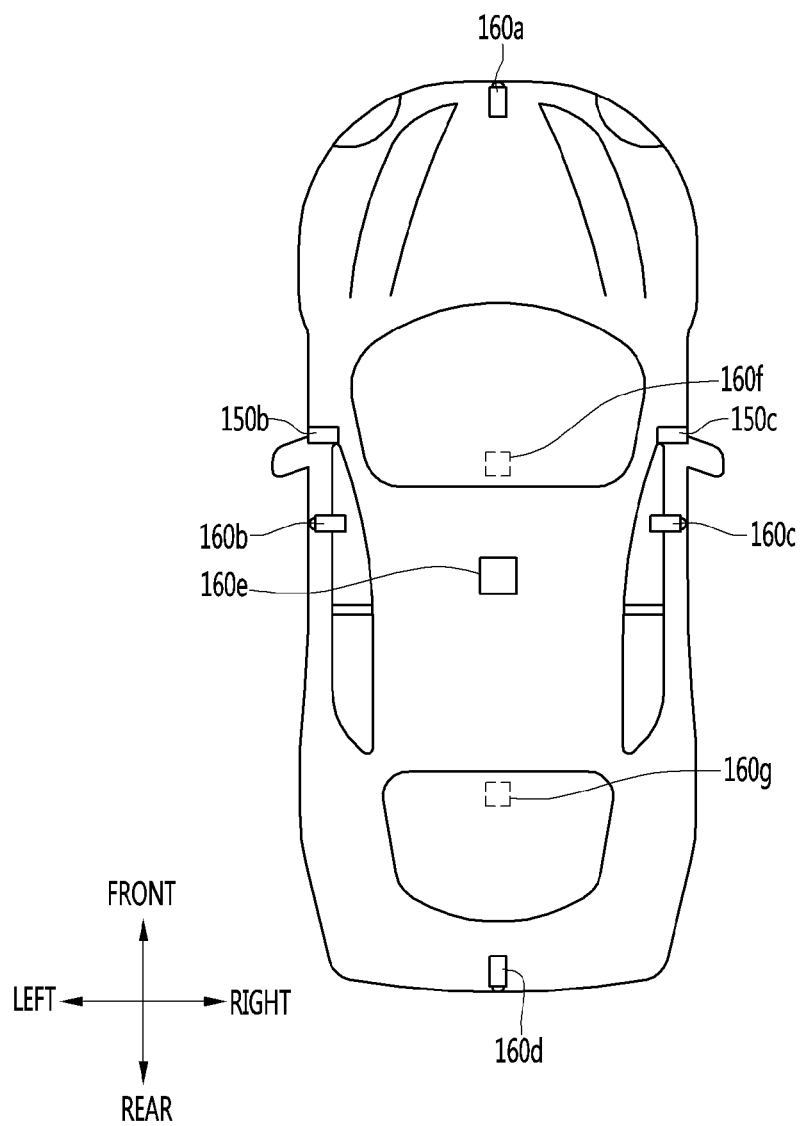

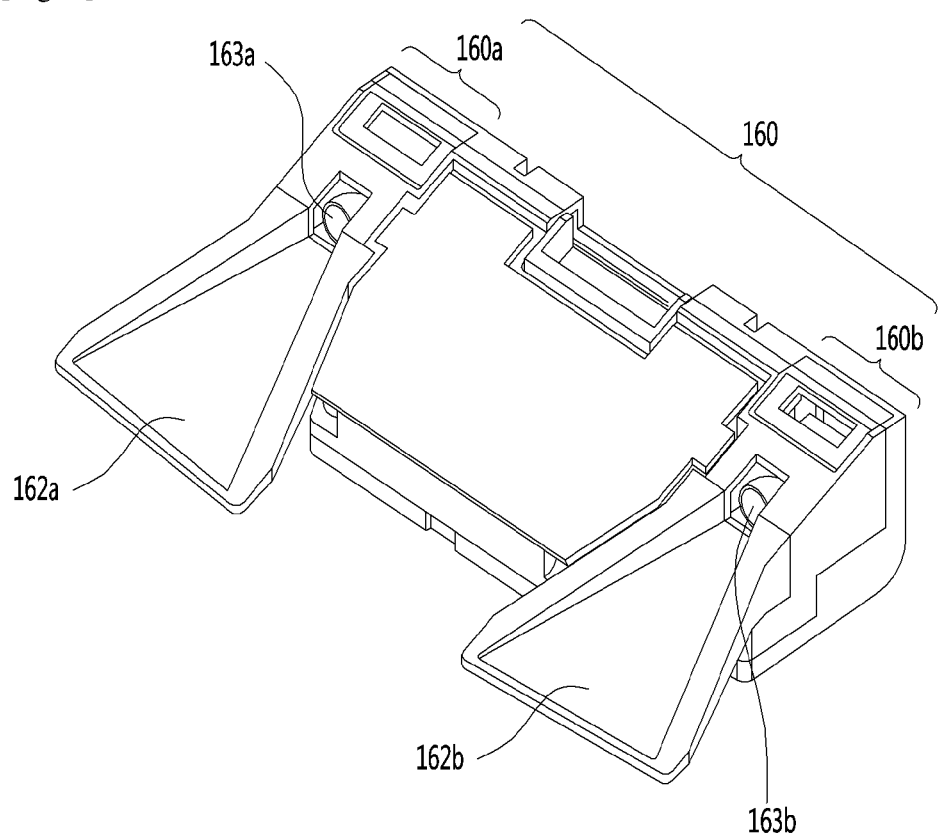
[Fig. 4]

[Fig. 5]
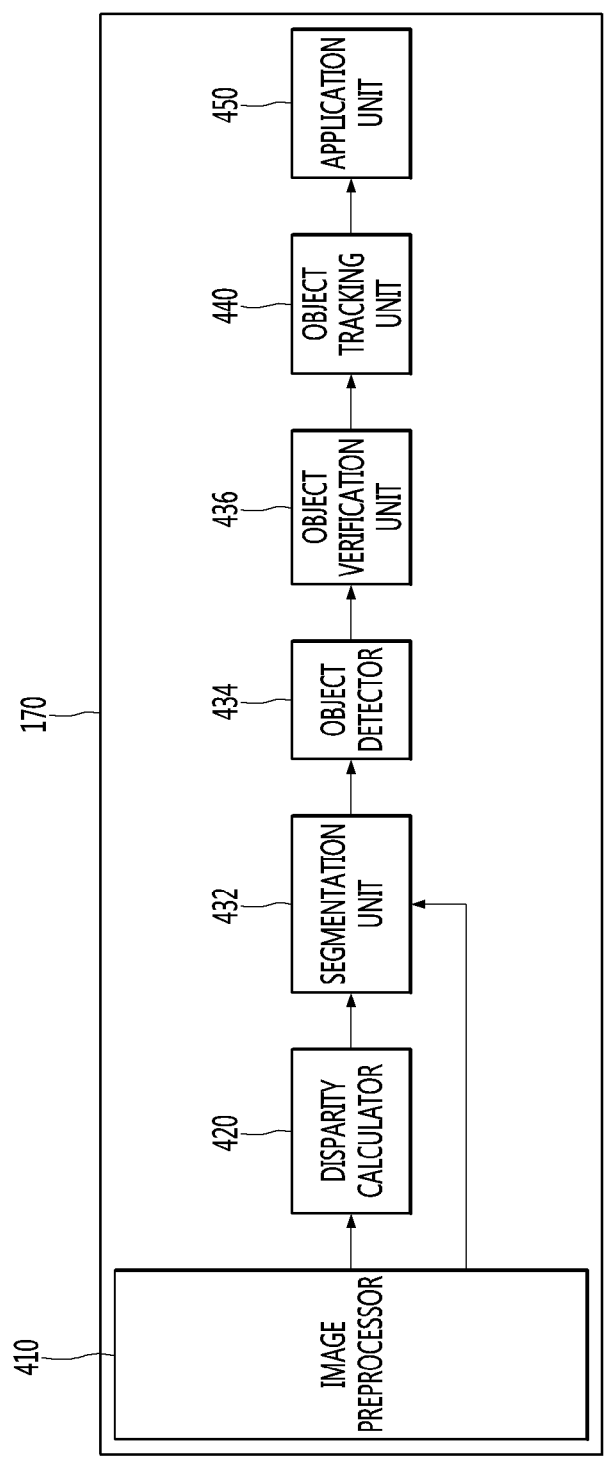

[Fig. 6]
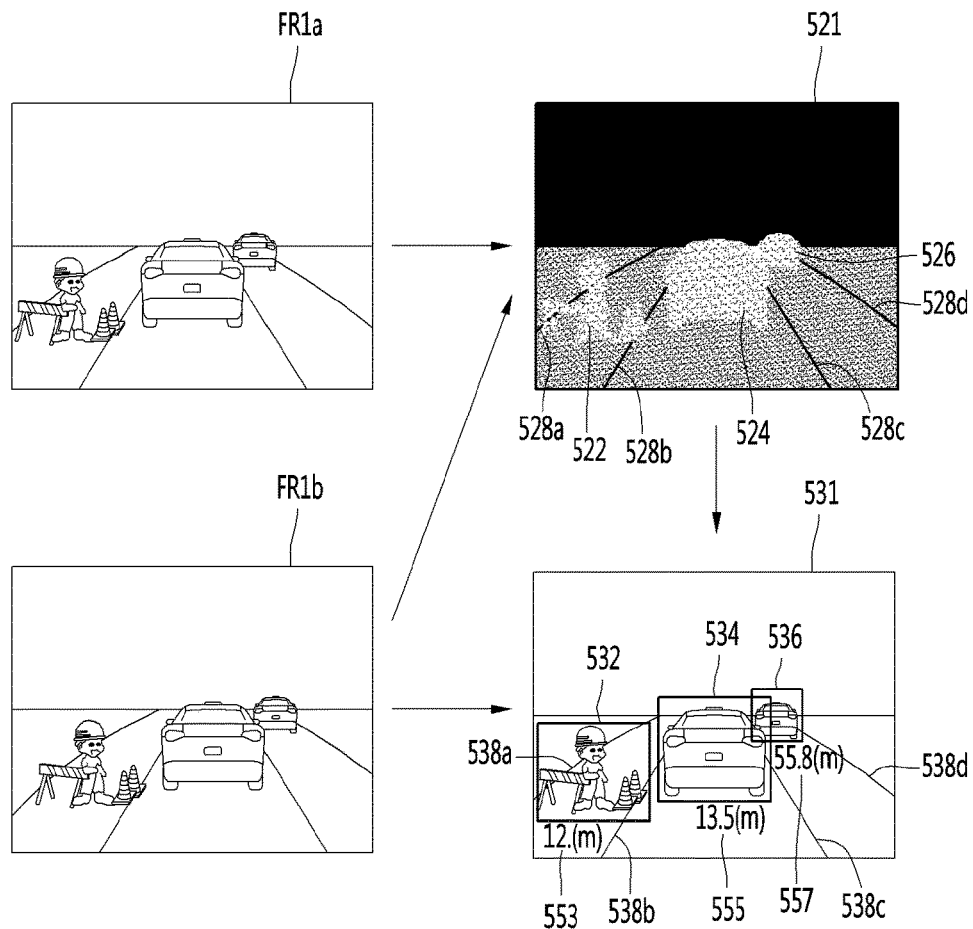
[Fig. 7]
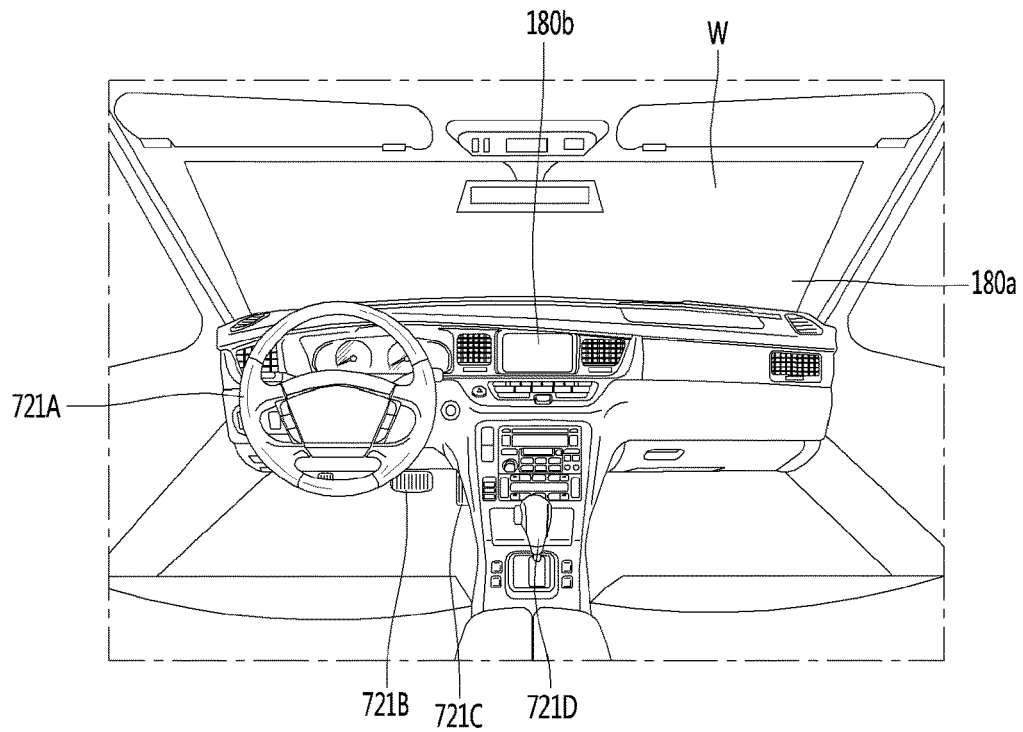

[Fig. 8]
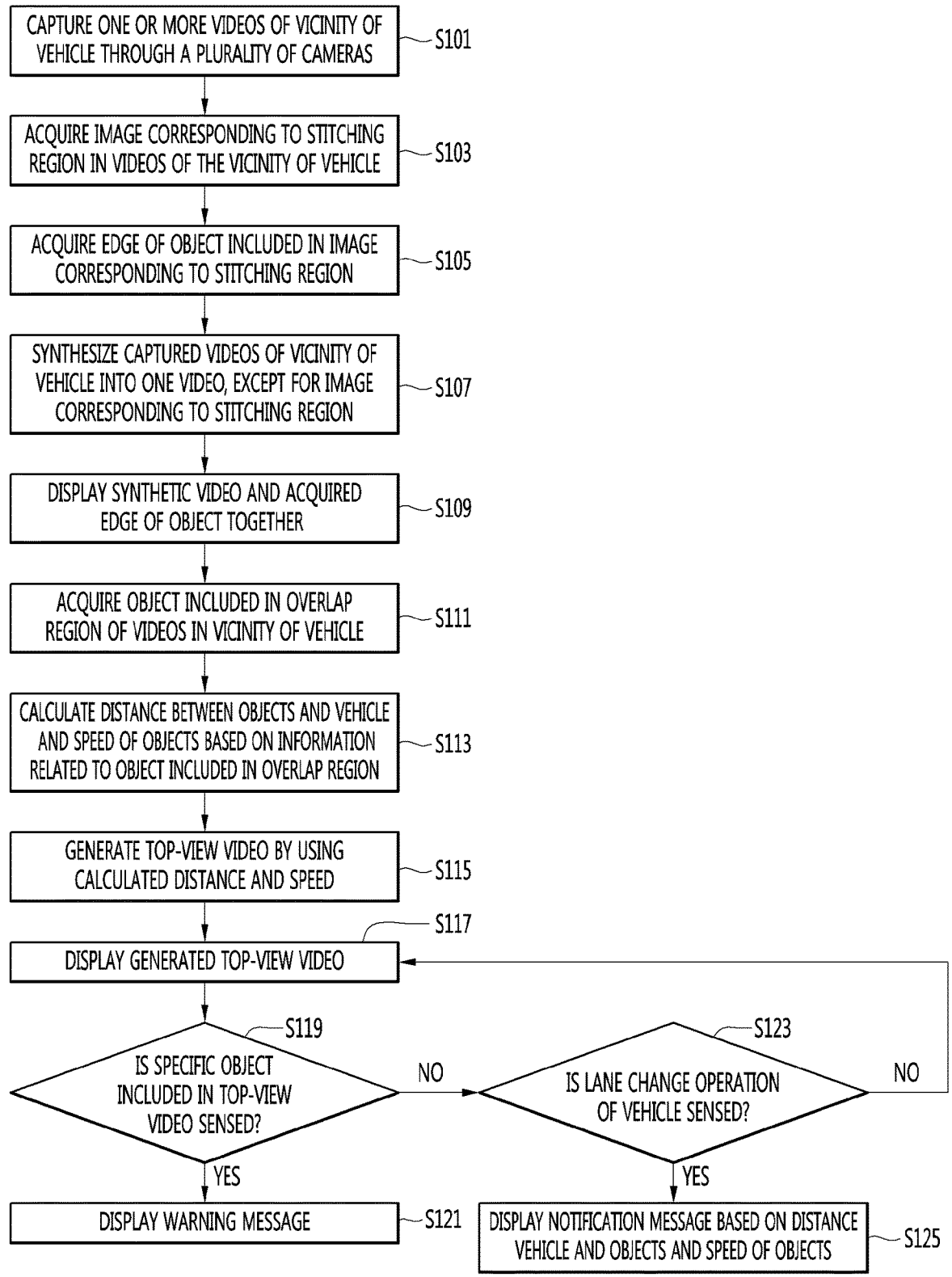

[Fig. 9]
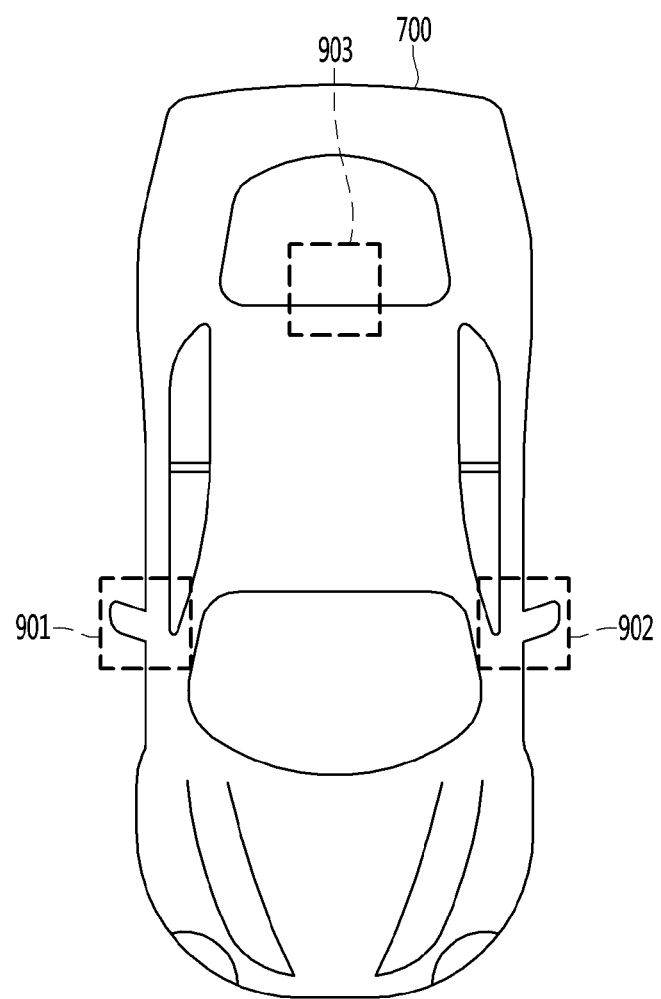

[Fig. 10]
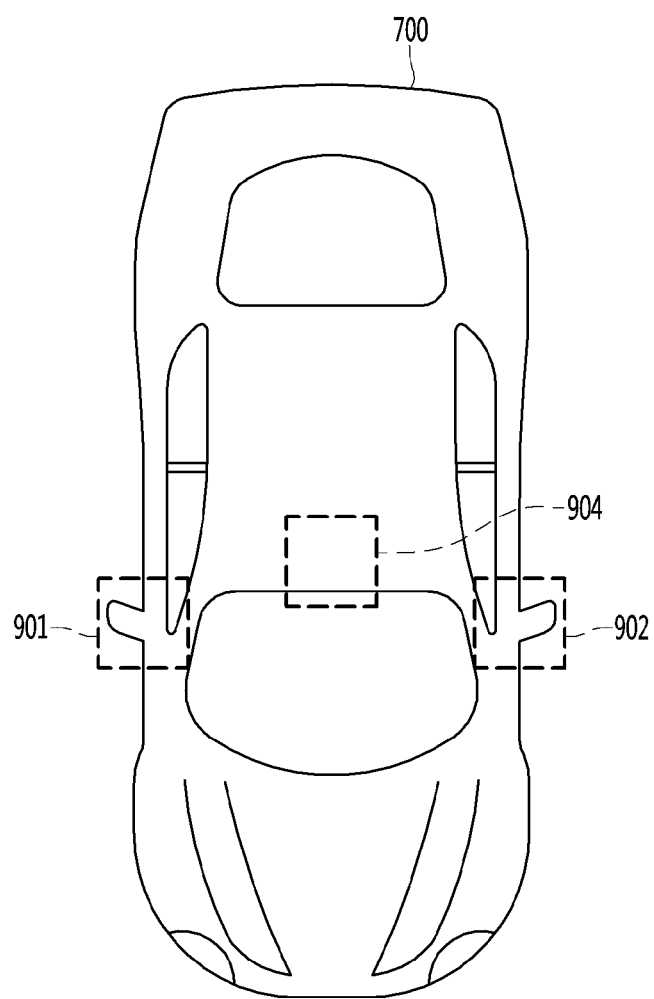

[Fig. 11]
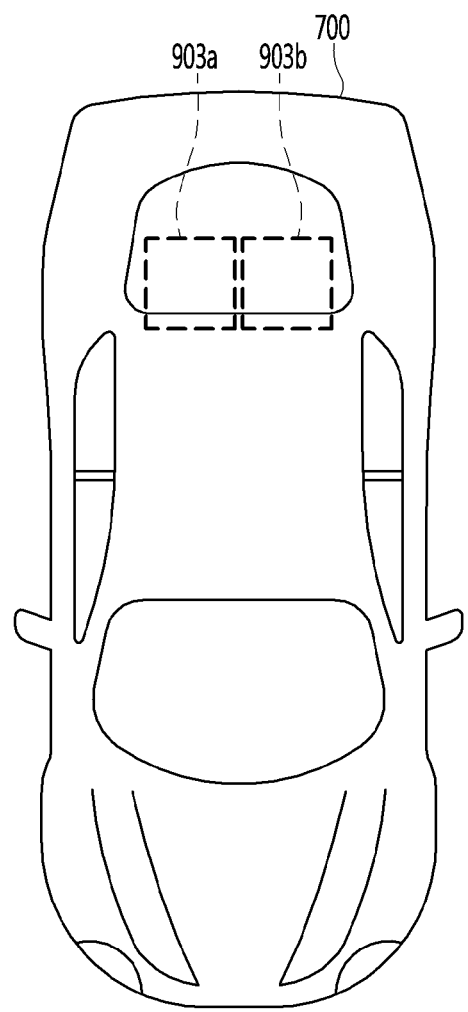

[Fig. 12]
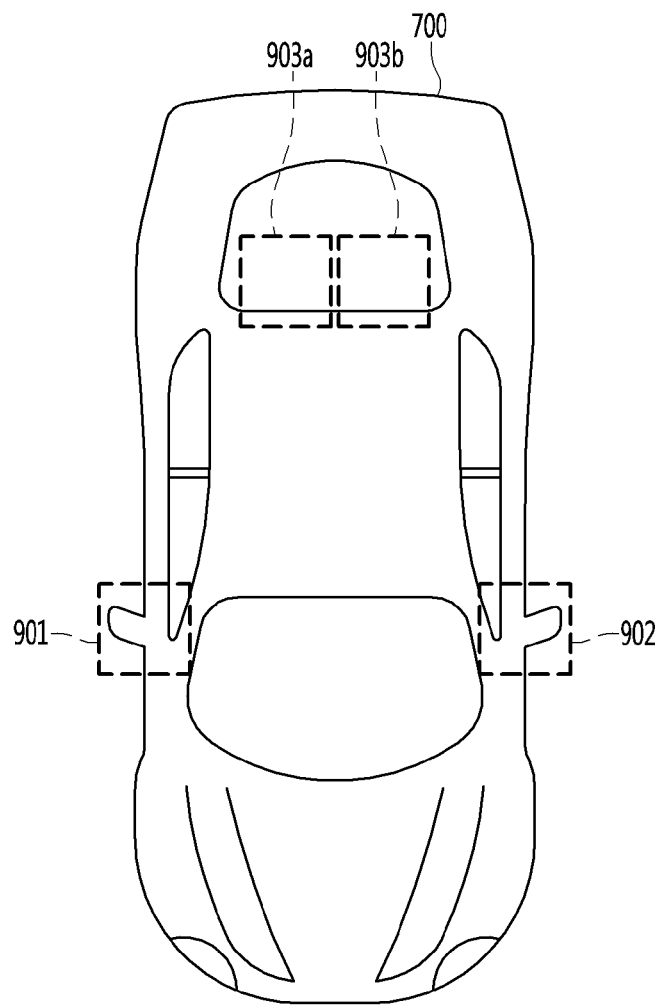
[Fig. 13A]
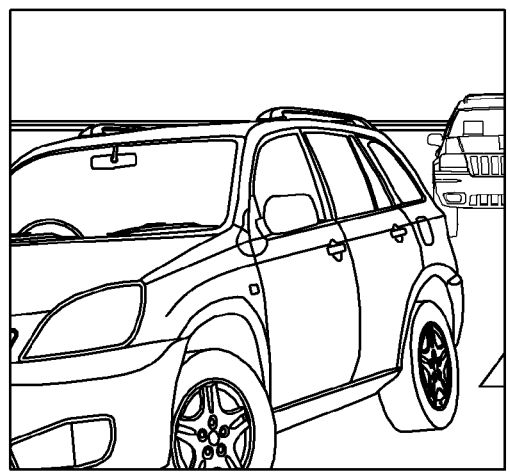

[Fig. 13B]
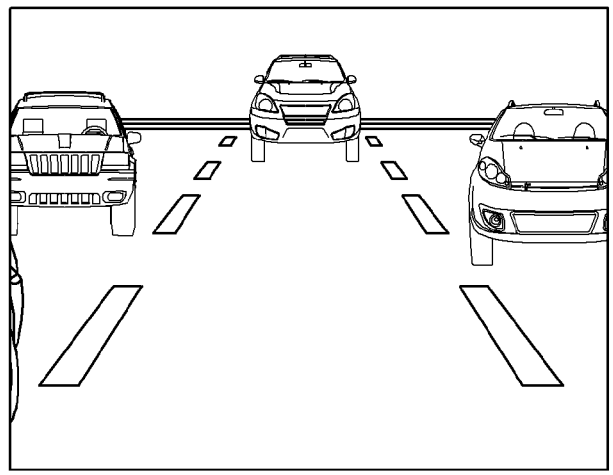
[Fig. 13C]
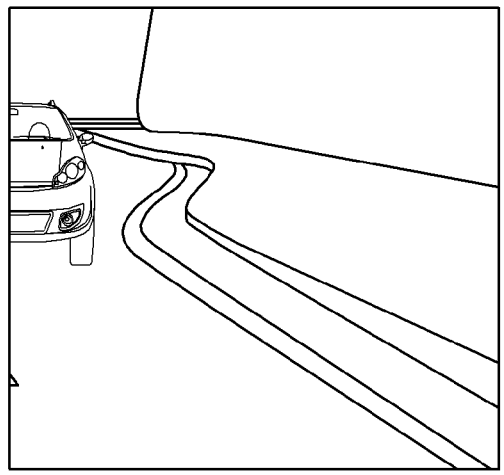
[Fig. 14]
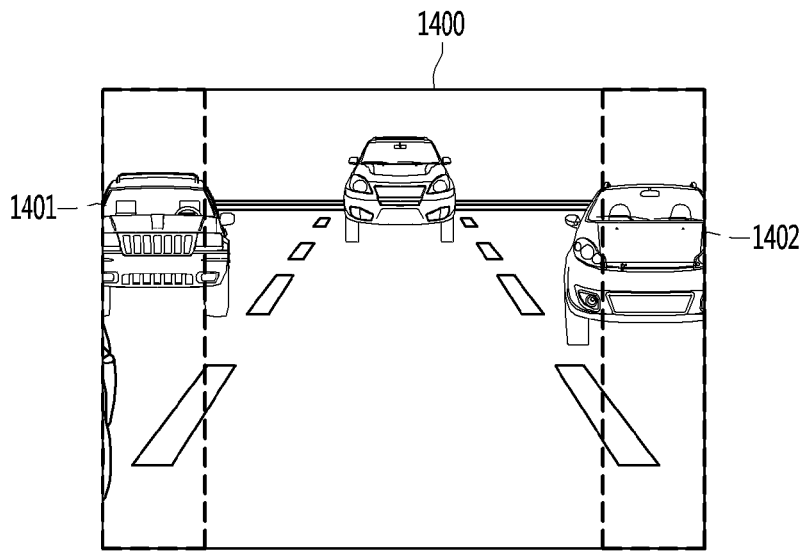

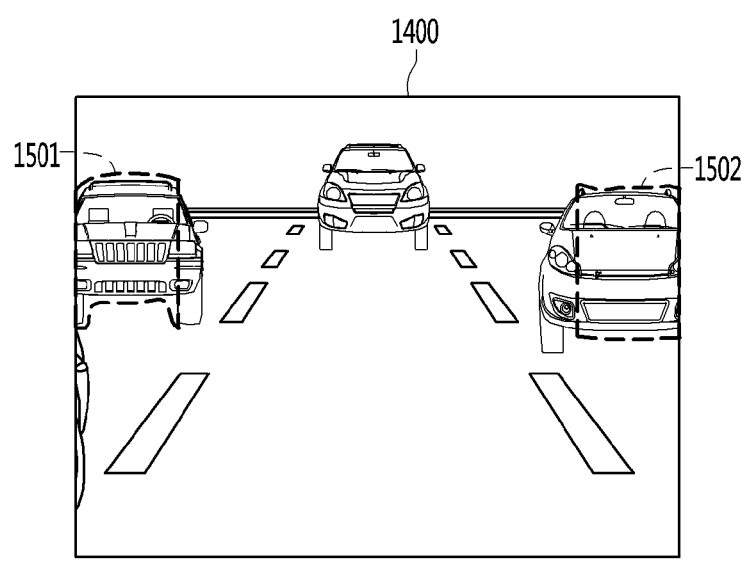
[Fig. 15]

[Fig. 16]
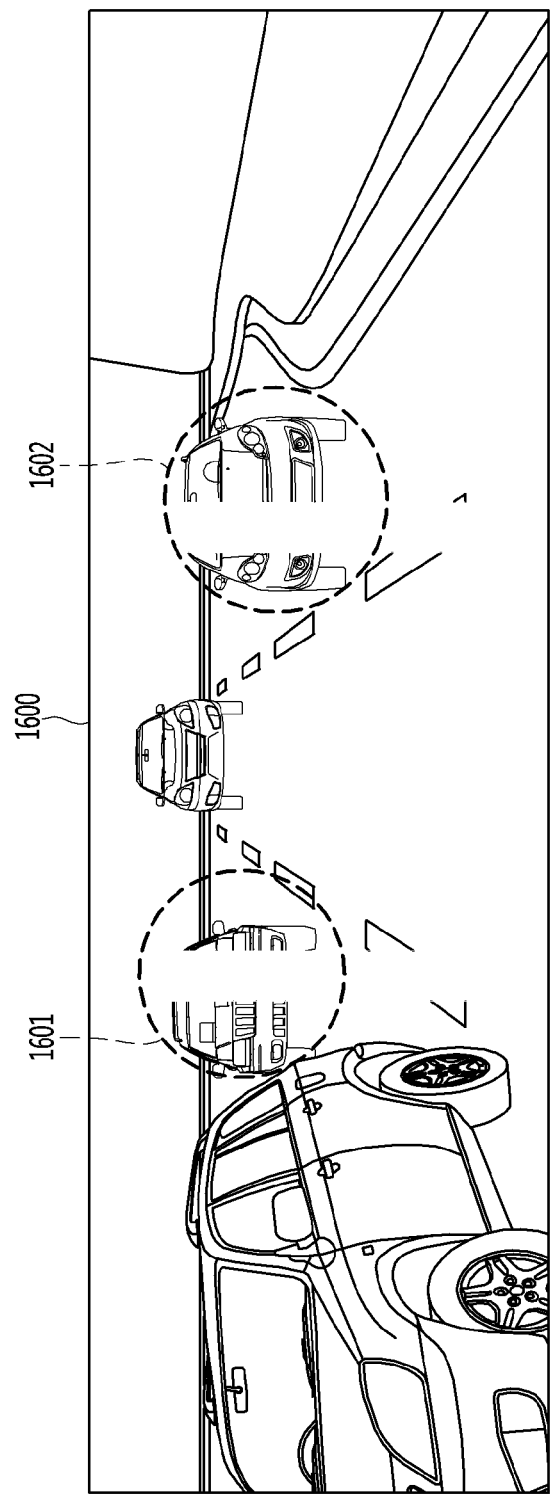

[Fig. 17]
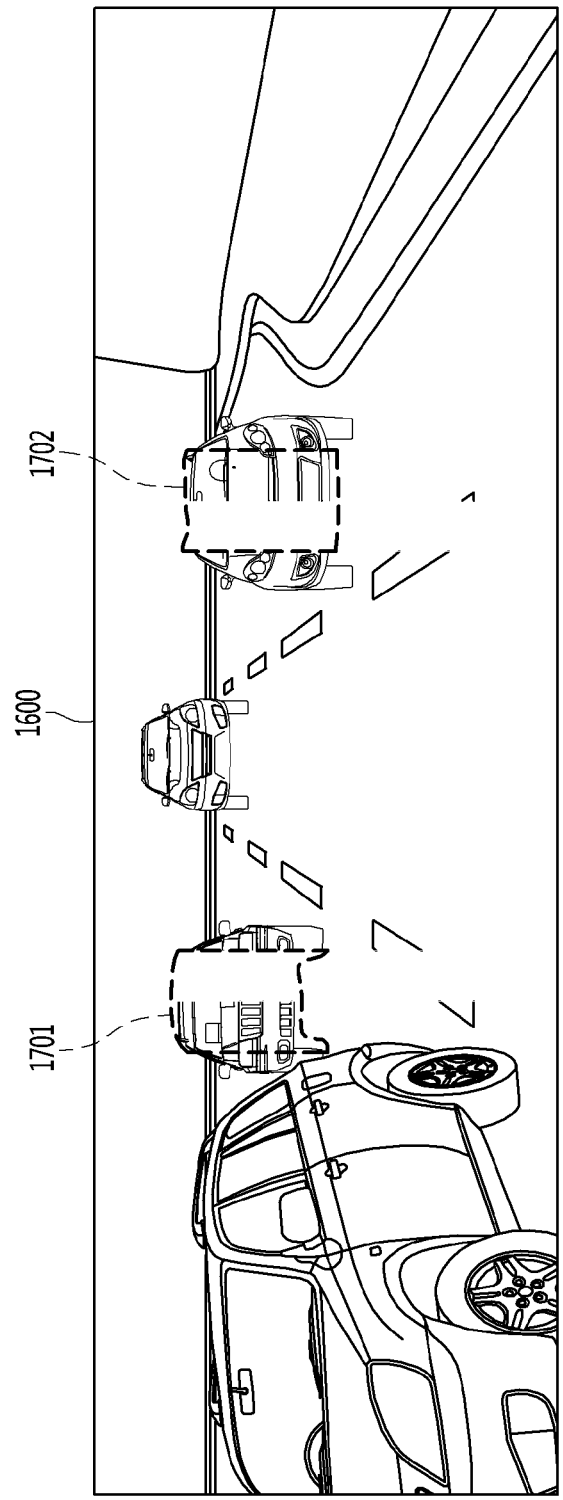

[Fig. 18A]
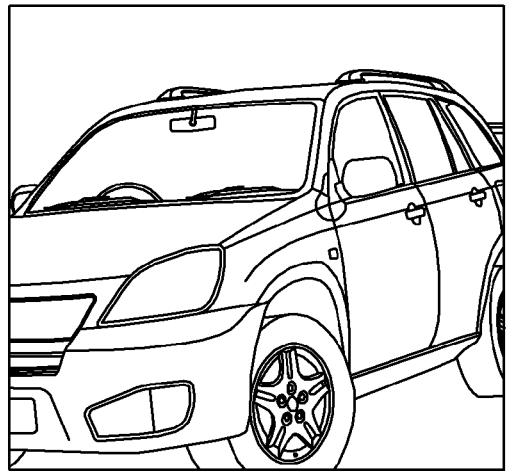
[Fig. 18B]
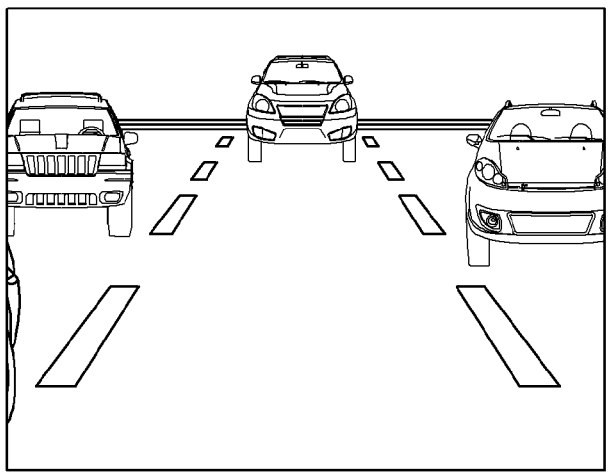
[Fig. 18C]
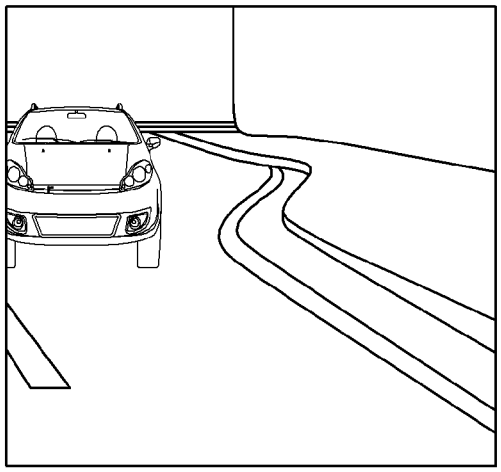

[Fig. 19]
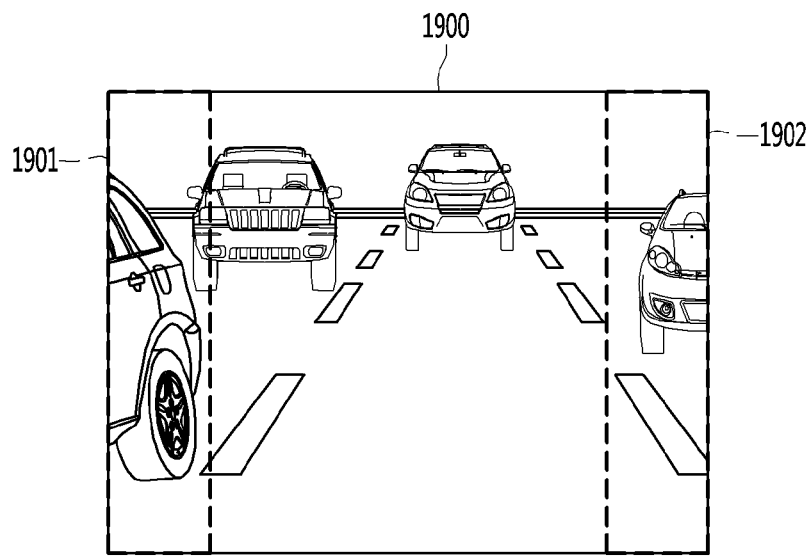
[Fig. 20]
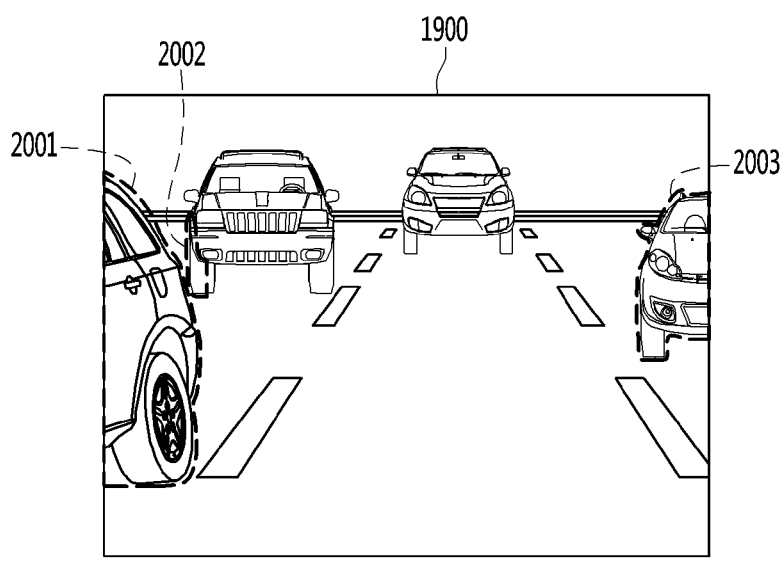

[Fig. 21]
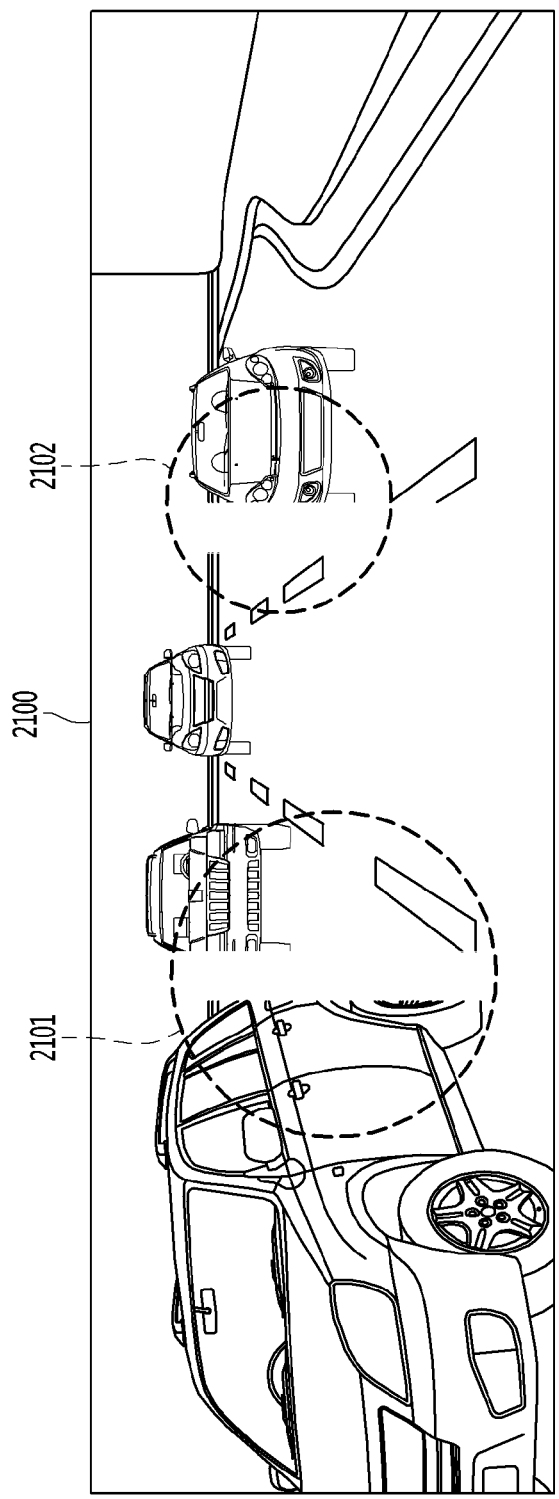

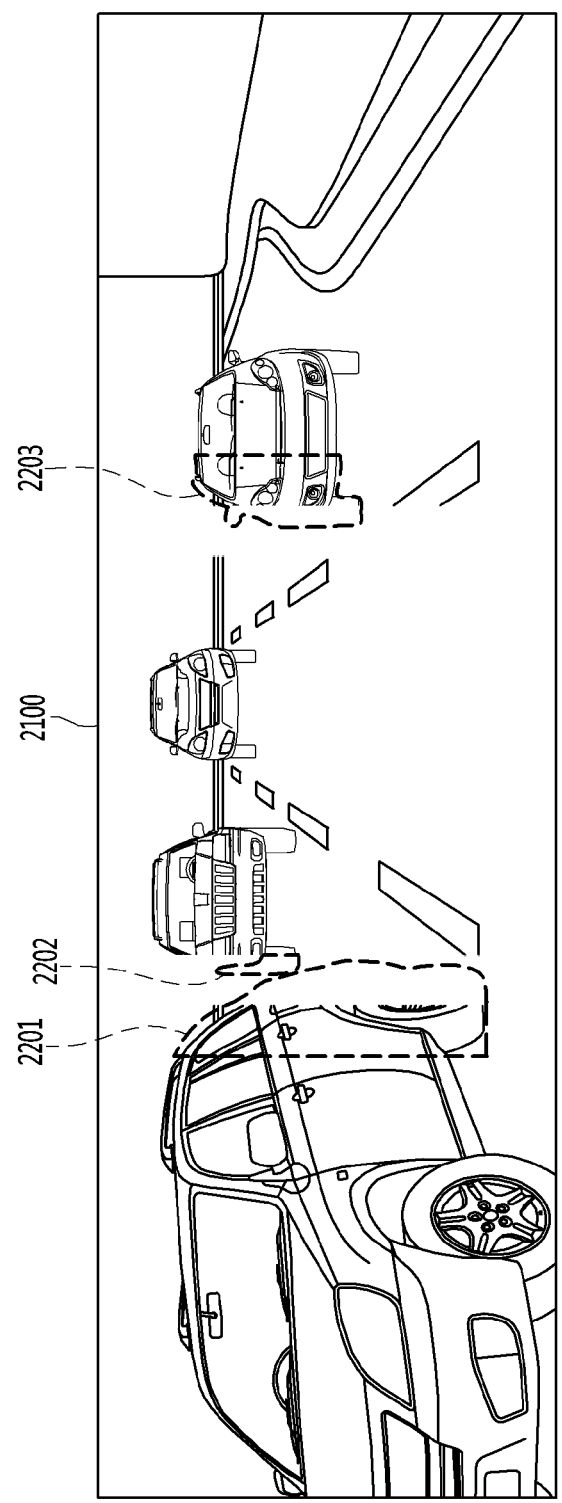
[Fig. 22]

[Fig. 23A]
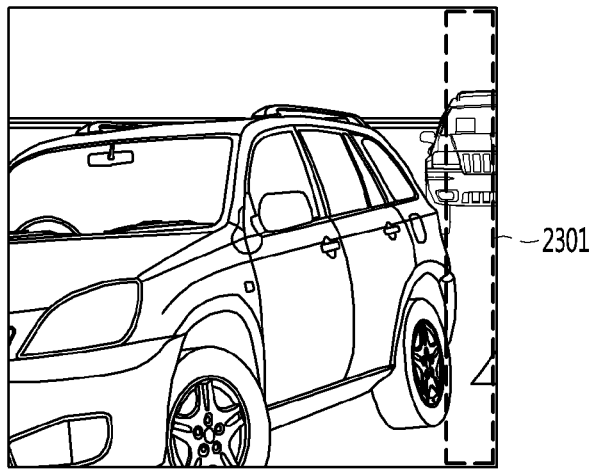
[Fig. 23B]
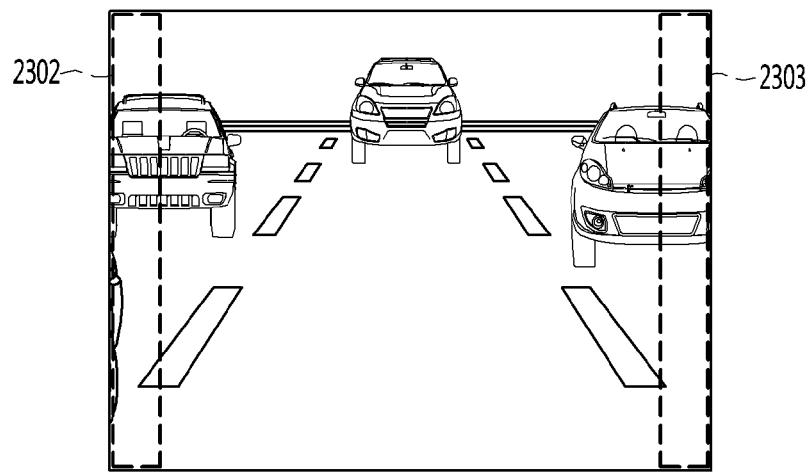
[Fig. 23C]
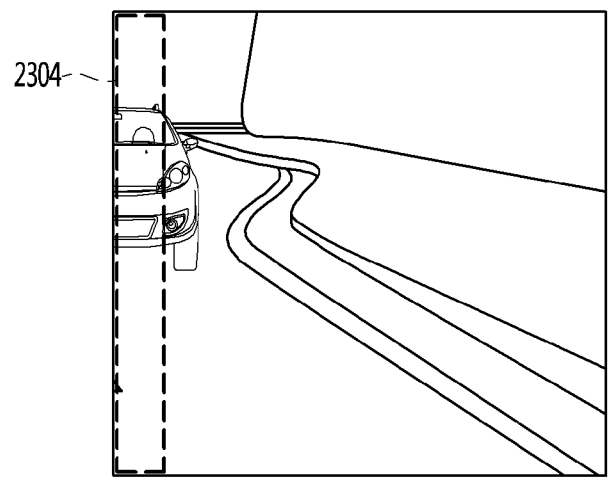

[Fig. 24]
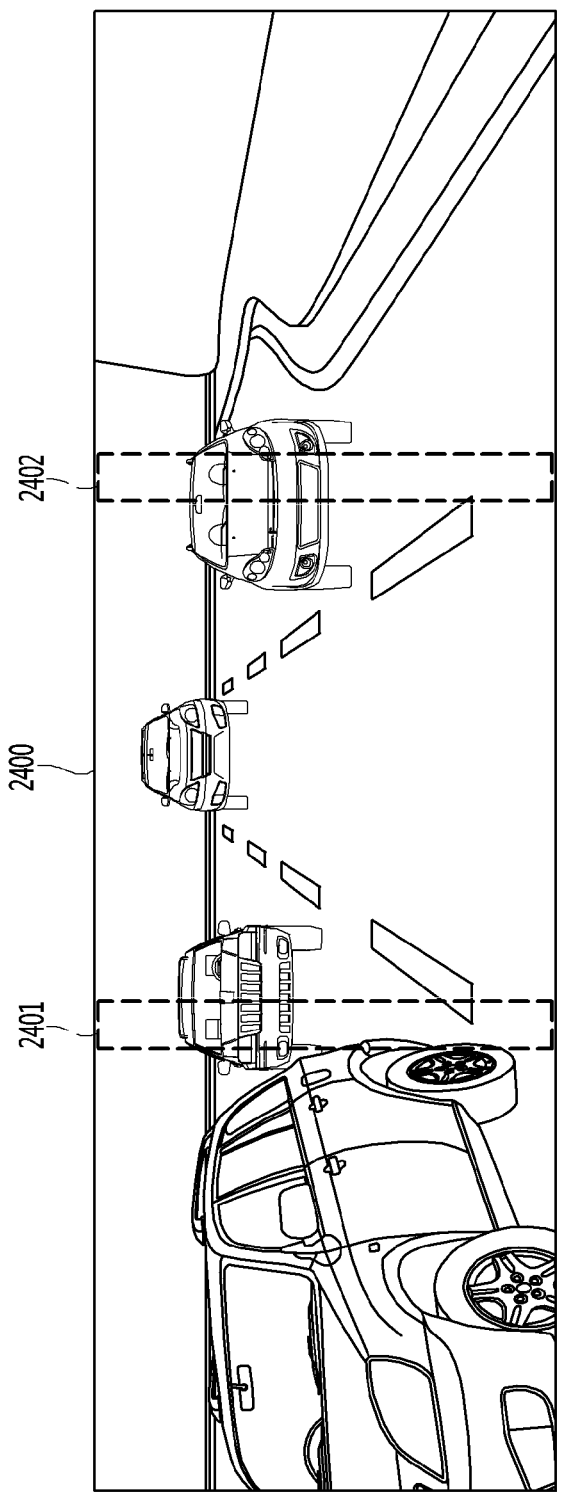

[Fig. 25A]
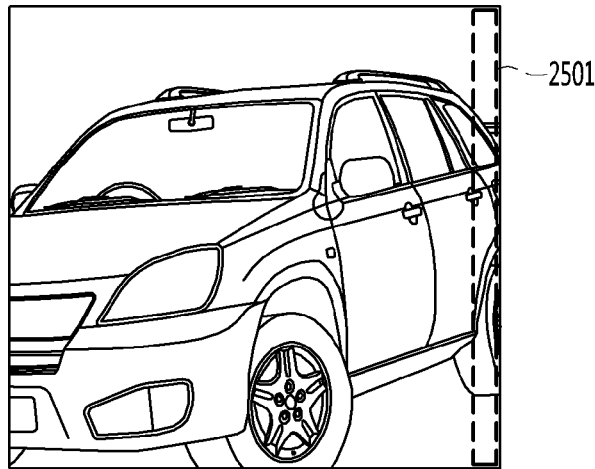
[Fig. 25B]
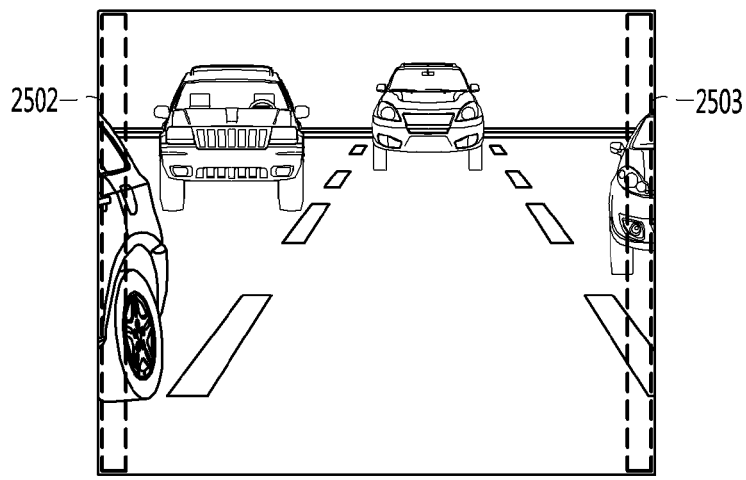
[Fig. 25C]
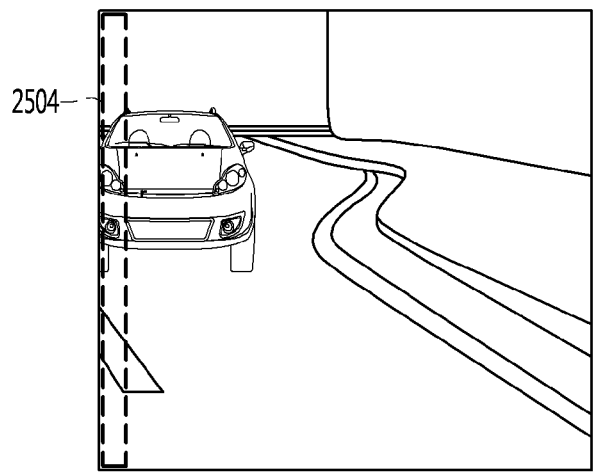

[Fig. 26]
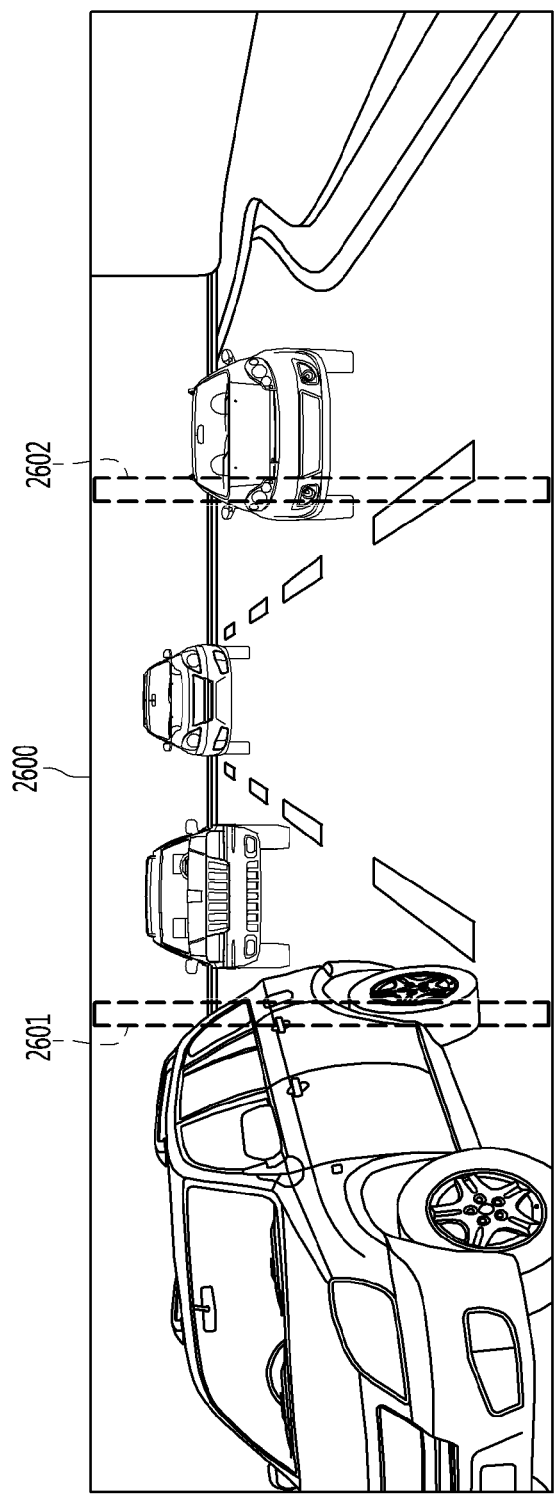

[Fig. 27A]
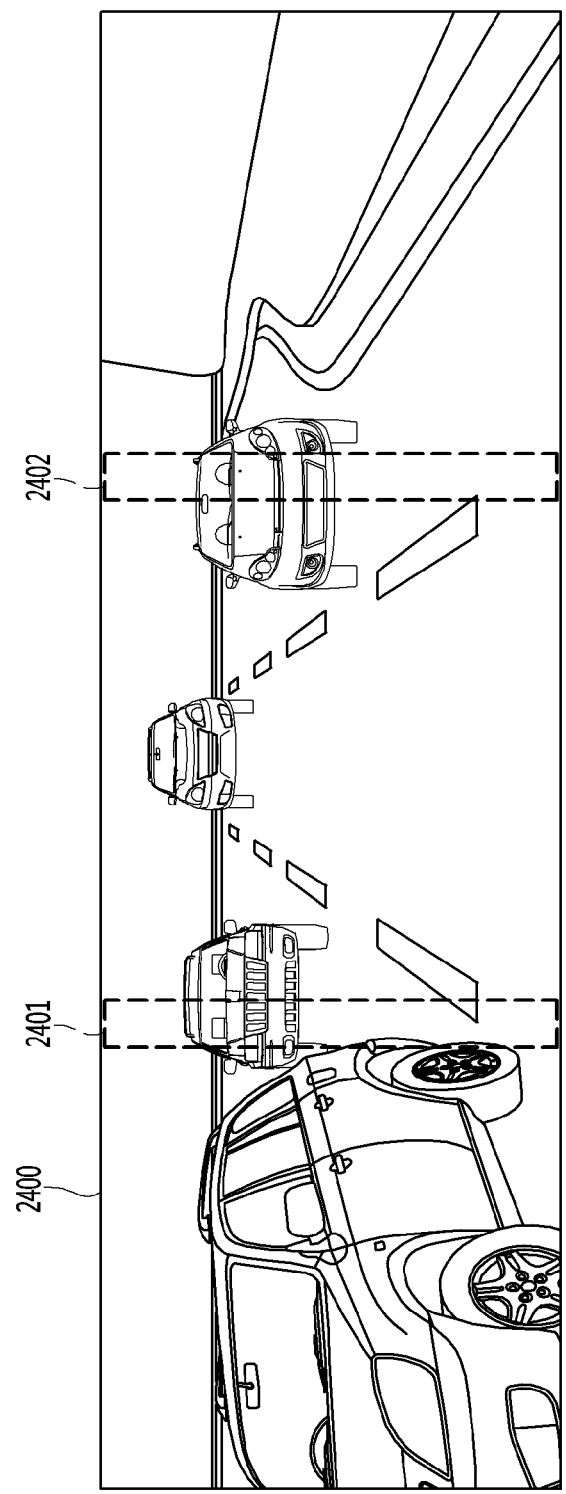

[Fig. 27B]
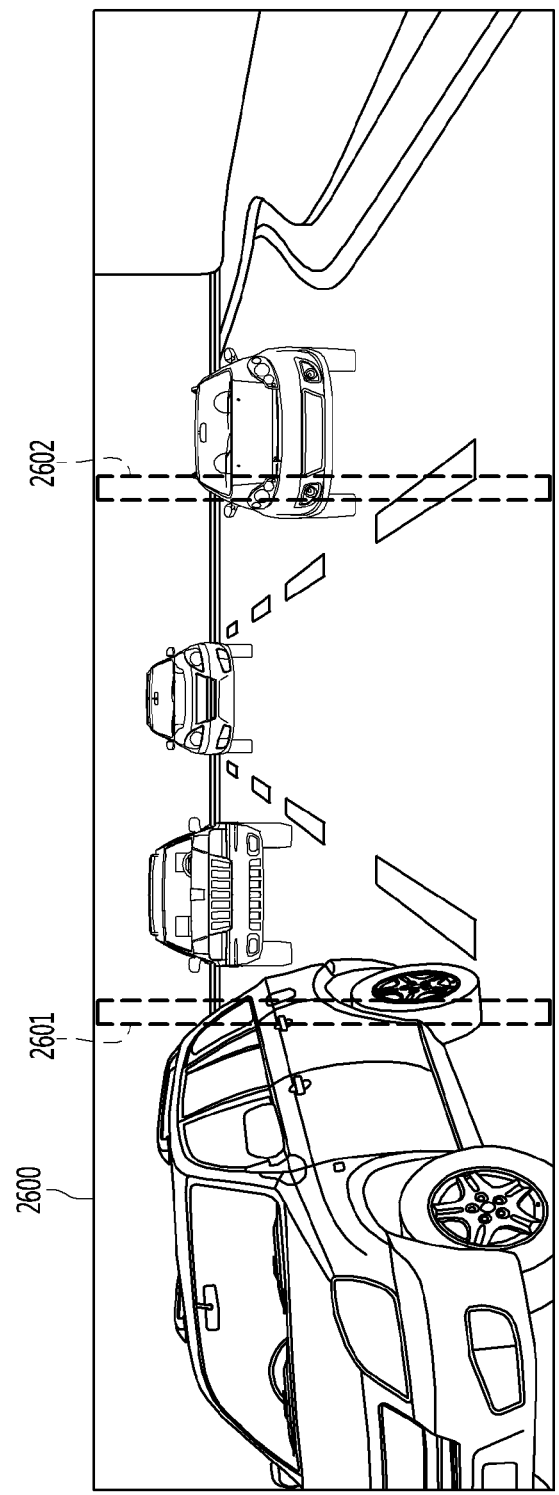

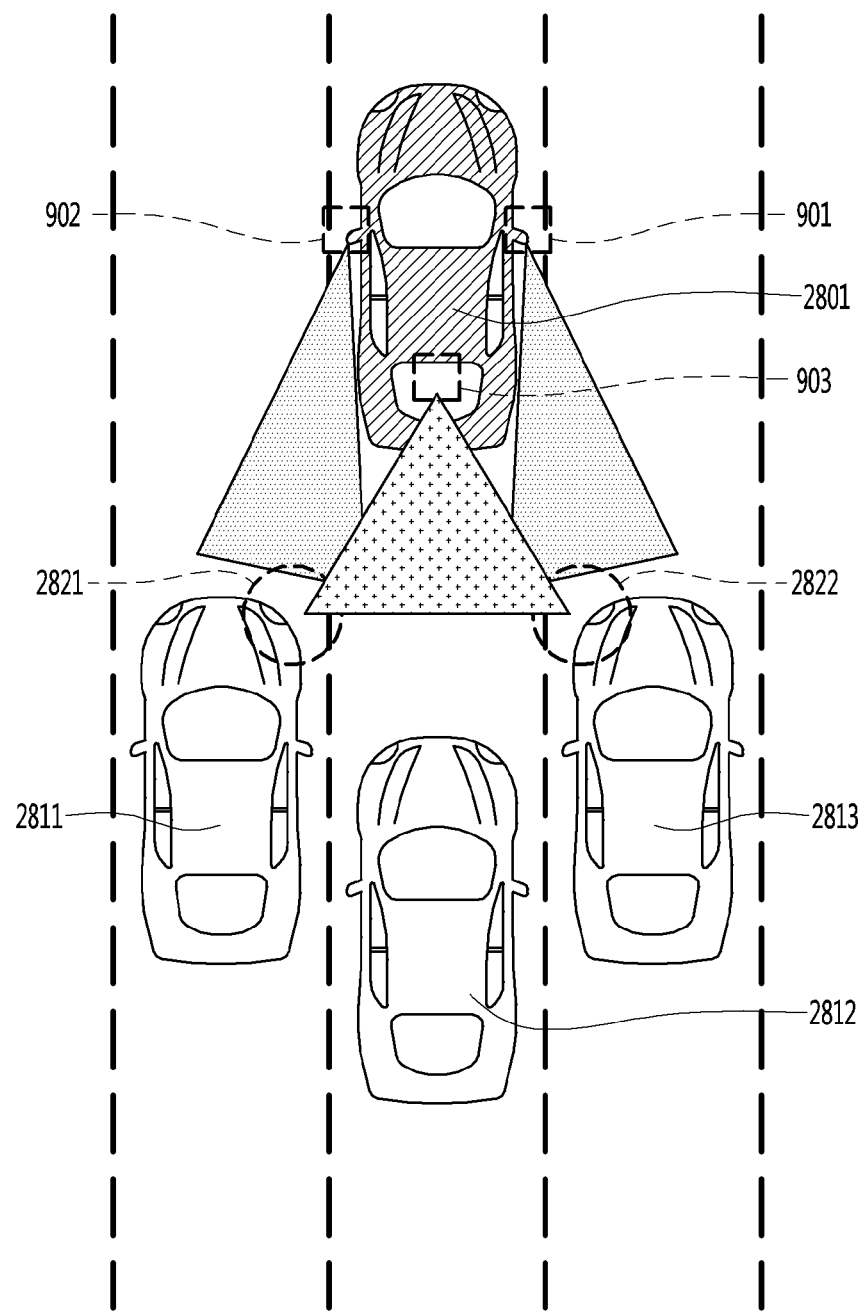
[Fig. 28]

[Fig. 29]
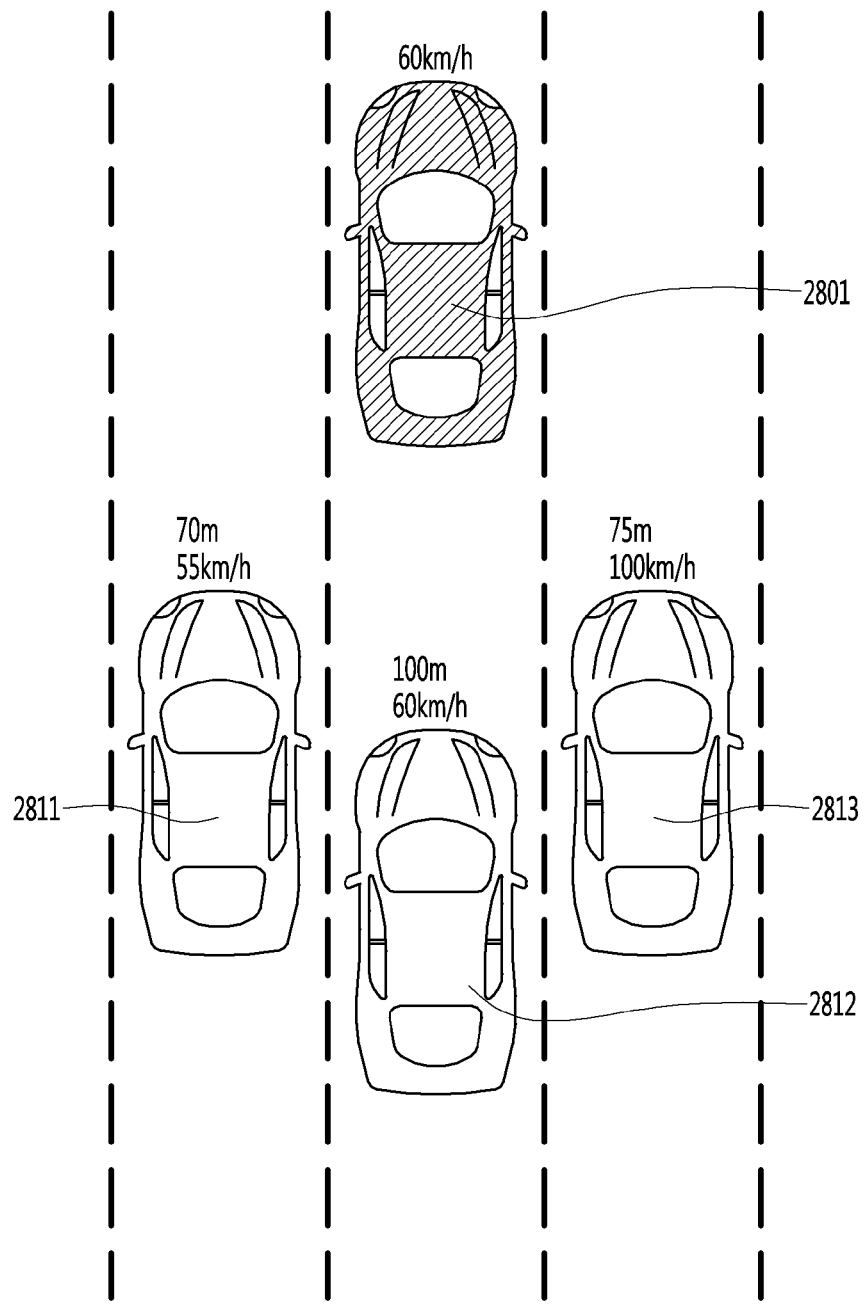

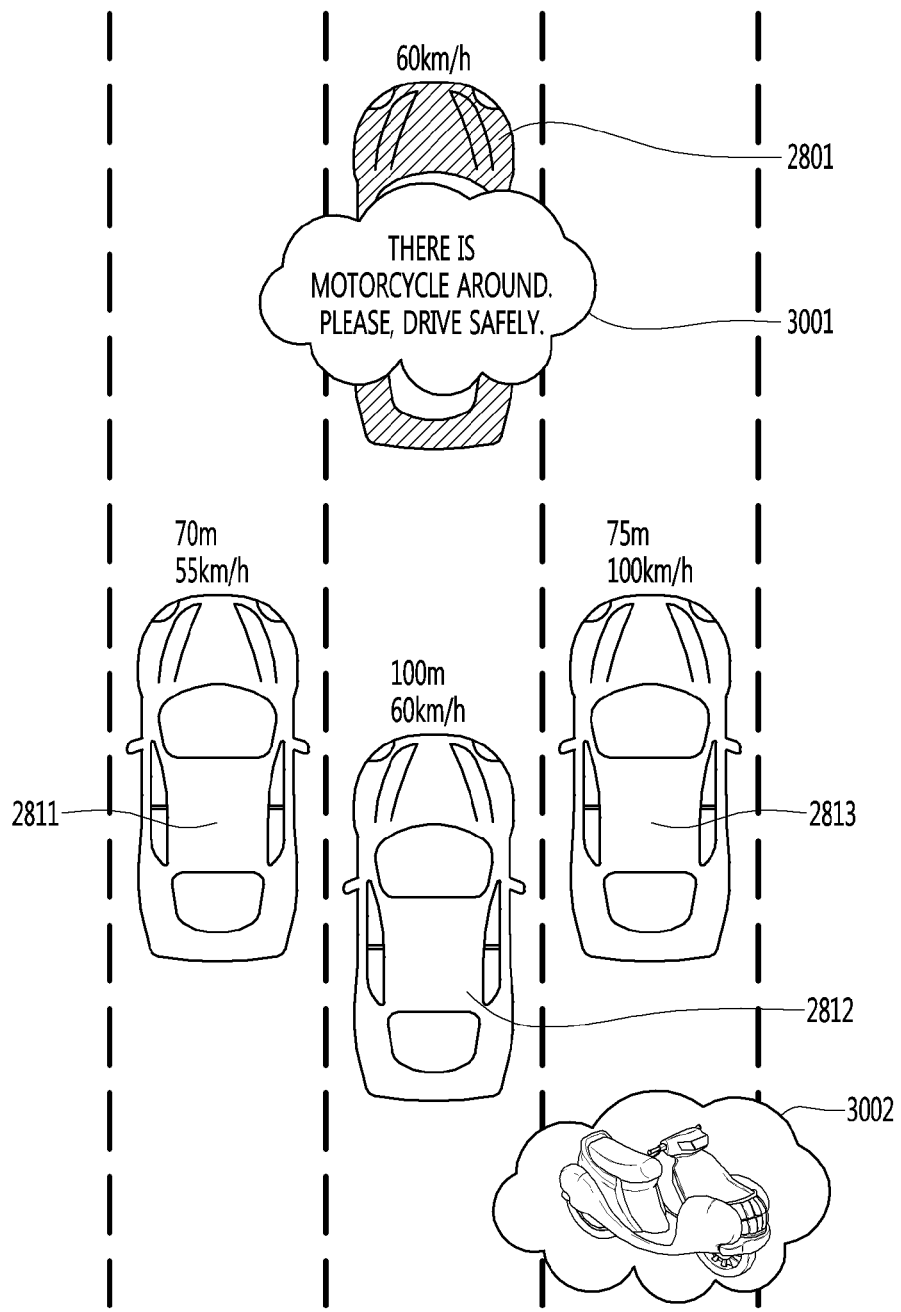
[Fig. 30]

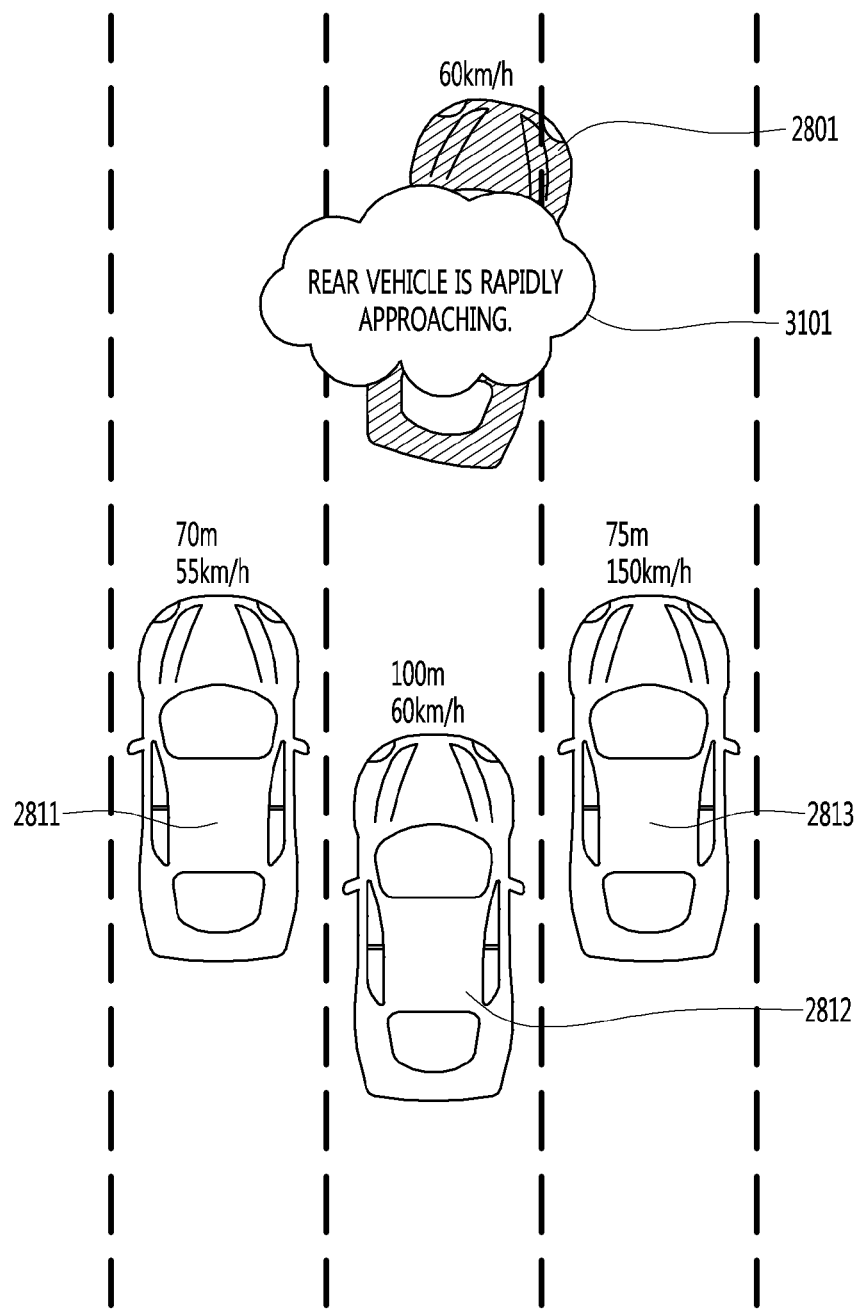
[Fig. 31]

[Fig. 32]
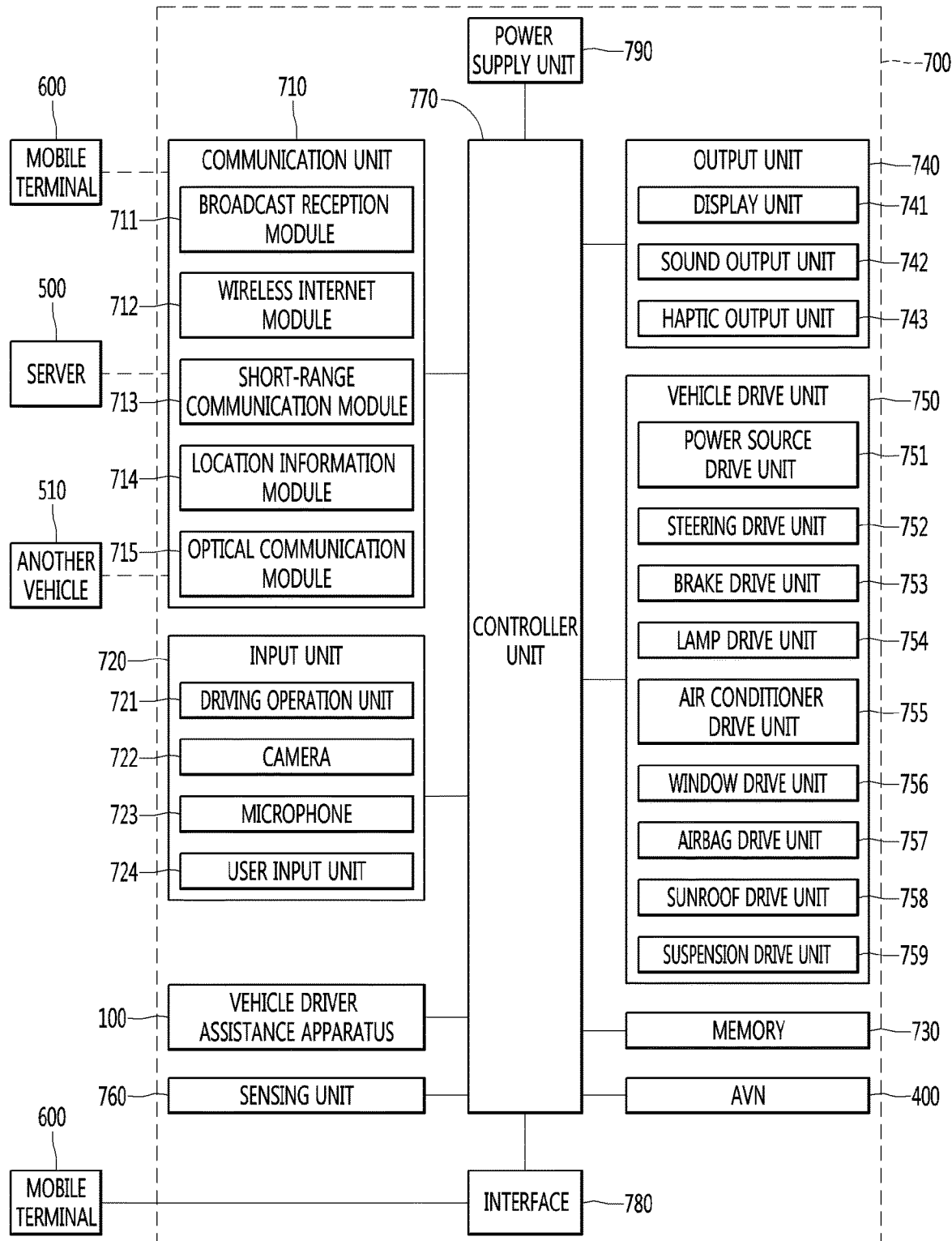

DRIVER ASSISTANCE APPARATUS AND VEHICLE HAVING THE SAME

CROSS-REFERENCE TO RELATED APPLICATIONS

This application is the National Phase of PCT International Application No. PCT/KR2016/011445 filed on Oct. 13, 2016, which claims the benefit of priority to Korean Patent Application No. 10-2016-0087502 filed in the Republic of Korea on Jul. 11, 2016, all which are hereby expressly incorporated by reference into the present application.

TECHNICAL FIELD

The present invention relates to a driver assistance apparatus and a vehicle having the same.

BACKGROUND ART

A vehicle is an apparatus that transports a user ridding therein in a desired direction. A representative example of a vehicle may be an automobile.

A vehicle includes an internal combustion engine vehicle, an external combustion engine vehicle, a gas turbine vehicle, an electric vehicle, etc. according to type of motor used.

The electric vehicle refers to a vehicle for driving an electric motor using electric energy and includes a pure electric vehicle, a hybrid electric vehicle (HEV), a plug-in hybrid electric vehicle (PHEV), a fuel cell electric vehicle (FCEV), etc.

Recently, intelligent vehicles have been actively developed for safety or convenience of a driver or pedestrian.

The intelligent vehicle is an advanced vehicle using information technology (IT) and is also referred to as a smart vehicle. The intelligent vehicle provides optimal traffic efficiency by introduction of an advanced vehicle system and via association with an intelligent traffic system (ITS).

In addition, research into a sensor mounted in such an intelligent vehicle has been actively conducted. More specifically, a camera, an infrared sensor, a radar, a global positioning system (GPS), a Lidar, a gyroscope, etc. are used for the intelligent vehicle. Among others, the camera is an important sensor playing the role of human eyes.

Accordingly, with development of various sensors and electronic apparatuses, a vehicle including a driver assistance function for assisting driving of a user and improving driving safety and convenience is attracting considerable attention.

As a part of the driver assistance function, a mirror functioning as a side mirror or a back mirror has been replaced with a camera in the latest vehicles. Therefore, till now, a driver must respectively check a left side mirror, a right side mirror, and a back mirror in order to grasp a situation of the vicinity of a vehicle, but now, the driver has only to check one video acquired by synthesizing videos captured by a plurality of cameras located in the vehicle.

However, when the videos captured by the plurality of cameras are synthesized, there occurs a problem that a specific object disappears. This is, for example, because an object viewed through a camera disposed in the rear of the vehicle is not viewed through a camera disposed in the right side of the vehicle. Accordingly, in order for an object not to disappear, there is a need for a method of naturally synthesizing videos captured by a plurality of cameras.

Furthermore, when the videos captured by the plurality of cameras are synthesized, there is a problem that a stitching region in which the videos are connected abruptly moves. As described above, when the stitching region abruptly moves, a stream of the videos becomes unnatural. This may disperse concentration of the driver to interrupt driving.

DISCLOSURE OF INVENTION

Technical Problem

The purpose of the present invention is to provide a driver assistance apparatus which synthesizes videos of the vicinity of a vehicle captured by a plurality of cameras such that objects included in the videos of the vicinity of the vehicle do not disappear, and a vehicle having the same.

The purpose of the present invention is to provide a driver assistance apparatus which allows a synthetic video to be naturally displayed by fixing a stitching region in which videos are connected, when synthesizing videos of the vicinity of a vehicle captured by a plurality of cameras, and a vehicle having the same.

The purpose of the present invention is to provide a driver assistance apparatus which provides a top-view video displaying a situation of the vicinity of a vehicle viewed from above by using information included in videos of the vicinity of the vehicle captured by a plurality of cameras, and a vehicle having the same.

The purpose of the present invention is to provide a driver assistance apparatus which displays a notification message for notifying a user of a situation when a specific object such as a motorcycle or a dangerous situation in changing a lane is sensed, and a vehicle having the same.

Solution to Problem

A driver assistance apparatus according to an embodiment of the present invention includes: a first camera configured to capture a first video of the vicinity of a vehicle; a second camera configured to capture a second video of the vicinity of the vehicle; a processor configured to extract a first edge of an object included in a first stitching region in which the first video and the second video of the vicinity of the vehicle are connected; and a display unit configured to overlap and display the first edge and a synthetic video of the first and second videos of the vicinity of the vehicle except for the first stitching region, wherein the first stitching region is a fixed region included in the first video and the second video of the vicinity of the vehicle.

The driver assistance apparatus according to the embodiment of the present invention may further include a third camera configured to capture a third video of the vicinity of the vehicle, wherein the processor extracts a second edge of an object included in a second stitching region in which the second video and the third video of the vicinity of the vehicle are connected, the display unit overlaps and displays the first and second edges and a synthetic video of the first to third videos of the vicinity of the vehicle except for the first stitching region and the second stitching region, and the second stitching region is a fixed region included in the second video and the third video of the vicinity of the vehicle.

In the driver assistance apparatus according to an embodiment of the present invention, the processor may calculate a speed of the objects included in the first stitching region and the second stitching region and a distance between each of the objects and the vehicle.

In the driver assistance apparatus according to an embodiment of the present invention, the display unit may further display a top-view video of the vicinity of the vehicle viewed from above by using the calculated speed and the calculated distance.

In the driver assistance apparatus according to an embodiment of the present invention, the processor may sense a specific object included in the first to third videos of the vicinity of the vehicle, the display unit may further display a message indicating that the specific object is sensed, and the specific object may indicate a kind of a preset object.

In the driver assistance apparatus according to an embodiment of the present invention, the processor may sense a lane change operation of the vehicle, and when the lane change operation is sensed, the display unit may further display a lane change guide message based on the distance between the vehicle and each of the objects and the speed of the objects.

In the driver assistance apparatus according to an embodiment of the present invention, the processor may sense the lane change operation of the vehicle through a movement of a wheel of the vehicle.

In the driver assistance apparatus according to an embodiment of the present invention, the processor may sense the lane change operation of the vehicle through a move of a vehicle icon included in the top-view video.

In the driver assistance apparatus according to an embodiment of the present invention, when the lane change operation is sensed, the display unit may display a message based on a speed of an object located on a lane into which the vehicle is to switch, and a distance between the vehicle and the object.

In the driver assistance apparatus according to an embodiment of the present invention, the first camera may be a camera located at a front right side of the vehicle, the second camera may be a camera located at a rear center of the vehicle, and the third camera may be a camera located at a front left side of the vehicle.

An embodiment of the present invention may provide a vehicle having the above-described driver assistance apparatus.

Advantageous Effects of Invention

According to various embodiments of the present invention, a drive guide video, which accurately displays a situation of the vicinity of a vehicle, may be provided without omitting an object located in the vicinity of the vehicle.

According to various embodiments of the present invention, a drive guide video, a movement of which is natural, may be provided because a stitching region of a video is fixed.

According to various embodiments of the present invention, since a situation of the vicinity of a vehicle is visible from above, a driver may more conveniently drive the vehicle.

According to various embodiments of the present invention, since a dangerous element capable of existing in the vicinity of a vehicle is provided to a driver in real time, the driver may more safely drive the vehicle.

BRIEF DESCRIPTION OF DRAWINGS

FIG. 1 is a diagram showing the appearance of a vehicle having a driver assistance apparatus according to an embodiment of the present invention.

FIG. 2 is a block diagram of a driver assistance apparatus according to an embodiment of the present invention.

FIG. 3 is a plan view of a vehicle having a driver assistance apparatus according to an embodiment of the present invention.

FIG. 4 is a diagram showing an example of a camera according to an embodiment of the present invention.

FIGS. 5 and 6 are diagrams illustrating an example of a method of generating image information from an image of a camera according to an embodiment of the present invention.

FIG. 7 is a diagram showing the inside of a vehicle having a driver assistance apparatus according to an embodiment of the present invention.

FIG. 8 is a flowchart illustrating a method of providing a drive guide video through a driver assistance apparatus according to an embodiment of the present invention.

FIG. 9 is a diagram illustrating positions of a plurality of cameras included in a driver assistance apparatus according to a first embodiment of the present invention.

FIG. 10 is a diagram illustrating positions of a plurality of cameras included in a driver assistance apparatus according to a second embodiment of the present invention.

FIG. 11 is a diagram illustrating positions of a plurality of cameras included in a driver assistance apparatus according to a third embodiment of the present invention.

FIG. 12 is a diagram illustrating positions of a plurality of cameras included in a driver assistance apparatus according to a fourth embodiment of the present invention.

FIGS. 13A to 13C are illustrative diagrams of videos of the vicinity of a vehicle captured by a plurality of cameras provided in a driver assistance apparatus according to an embodiment of the present invention.

FIG. 14 is an illustrative diagram for describing a method of acquiring an image corresponding to a stitching region from videos of the vicinity of a vehicle through a driver assistance apparatus according to an embodiment of the present invention.

FIG. 15 is an illustrative diagram for describing an operation of acquiring an edge of an object included in an image corresponding to a stitching region through a driver assistance apparatus according to an embodiment of the present invention.

FIG. 16 is an illustrative diagram of a video acquired by synthesizing videos of the vicinity of a vehicle into one video, except for an image corresponding to a stitching region according to an embodiment of the present invention.

FIG. 17 is an illustrative diagram for describing a state in which a synthetic video and an edge of an object are displayed together by a driver assistance apparatus according to an embodiment of the present invention.

FIGS. 18A to 18C are other illustrative diagrams of videos of the vicinity of a vehicle captured by a plurality of cameras included in a driver assistance apparatus according to an embodiment of the present invention.

FIG. 19 is another illustrative diagram for describing a method of acquiring an image corresponding to a stitching region from videos of the vicinity of a vehicle through a driver assistance apparatus according to an embodiment of the present invention.

FIG. 20 is another illustrative diagram for describing an operation of acquiring an edge of an object included in an image corresponding to a stitching region through a driver assistance apparatus according to an embodiment of the present invention.

FIG. 21 is another illustrative diagram of a video acquired by synthesizing videos of the vicinity of a vehicle into one video, except for an image corresponding to a stitching region according to an embodiment of the present invention.

FIG. 22 is another illustrative diagram for describing a state in which a synthetic video and an edge of an object are displayed together by a driver assistance apparatus according to an embodiment of the present invention.

FIGS. 23A to 23C are diagrams illustrating an operation of acquiring an overlap region of videos of the vicinity of a vehicle according to an embodiment of the present invention.

FIG. 24 is an illustrative diagram of a video acquired by overlapping and synthesizing acquired overlap regions.

FIGS. 25A to 25C are other illustrative diagrams for describing an operation of acquiring an overlap region of videos of the vicinity of a vehicle according to an embodiment of the present invention.

FIG. 26 is another illustrative diagram of a video acquired by overlapping and synthesizing acquired overlap regions.

FIGS. 27A and 27B are diagrams illustrating a comparison between drive guide videos before and after a stitching region moves.

FIG. 28 is a diagram illustrating an object included in an overlap region of videos of the vicinity of a vehicle according to an embodiment of the present invention.

FIG. 29 is a diagram illustrating a top-view video according to an exemplary embodiment.

FIG. 30 is a diagram illustrating a method of displaying a warning message as a specific object is sensed by a driver assistance apparatus according to an embodiment of the present invention.

FIG. 31 is a diagram illustrating a method of displaying a notification message according to a lane change of a vehicle according to an embodiment of the present invention.

FIG. 32 is a block diagram showing the internal configuration of the vehicle having the driver assistance apparatus shown in FIG. 1.

BEST MODE FOR CARRYING OUT THE INVENTION

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, suffixes "module" and "unit" are used only in consideration of ease in preparation of the specification, and do not have distinct meanings. Accordingly, the suffixes "module" and "unit" may be used interchangeably. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit technical ideas disclosed in the present specification. Therefore, it should be understood that the accompanying drawings include all modifications, equivalents and substitutions within the scope and sprit of the present invention.

It will be understood that although the terms first, second, etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless context clearly indicates otherwise.

In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification may include a car and a motorcycle. Hereinafter, a car will be focused upon.

A vehicle as described in this specification may include all of an internal combustion engine vehicle including an engine as a power source, a hybrid vehicle including both an engine and an electric motor as a power source, and an electric vehicle including an electric motor as a power source.

In the following description, the left of a vehicle means the left of the vehicle in the direction of travel and the right of the vehicle means the right of the vehicle in the direction of travel.

In the following description, a left hand drive (LHD) vehicle will be focused upon unless otherwise stated.

In the following description, the driver assistance apparatus is provided in a vehicle to exchange information necessary for data communication with the vehicle and to perform a driver assistance function. A set of some units of the vehicle may be defined as a driver assistance apparatus.

When the driver assistance apparatus is separately provided, at least some units (see FIG. 2) of the driver assistance apparatus are not included in the driver assistance apparatus but may be units of the vehicle or units of another apparatus mounted in the vehicle. Such external units transmit and receive data via an interface of the driver assistance apparatus and thus may be understood as being included in the driver assistance apparatus.

Hereinafter, for convenience of description, assume that the driver assistance apparatus according to the embodiment directly includes the units shown in FIG. 2.

Hereinafter, the driver assistance apparatus according to the embodiment will be described in detail with reference to the drawings.

Referring to FIG. 1, the vehicle according to the embodiment may include wheels 13FL and 13RL rotated by a power source and a driver assistance apparatus for providing driver assistance information to a user.

The driver assistance apparatus according to the embodiment of the present invention may provide videos acquired by photographing situations of the side and the rear of the vehicle. Accordingly, it is possible to remove a side mirror from the vehicle or reduce a size thereof, thereby expecting an effect of reducing a noise generated during driving or raising fuel efficiency of the vehicle.

The driver assistance apparatus according to the embodiment of the present invention may provide a video acquired by synthesizing a side video and a rear video of the vehicle into one video. Therefore, it is possible to grasp a situation of the vicinity of the vehicle at a glance, thereby providing a way to easily and conveniently drive the vehicle.

The driver assistance apparatus according to the embodiment of the present invention may provide a video acquired by extracting an edge of a vehicle included in any one of videos of the vicinity of the vehicle, displaying the extracted edge in other videos, and synthesizing the extracted edge and the other videos into one video. It is possible to fix a position of an overlap region in a synthetic video. Accordingly, it is possible to remove the unnaturalness of a video conventionally generated as an overlap region moves.

When the driver assistance apparatus according to the embodiment of the present invention provides the videos of the vicinity of the vehicle, the driver assistance apparatus may provide a top-view video of a situation of the vicinity of the vehicle viewed from above. Therefore, it is possible to more conveniently and accurately grasp the situation of the vicinity of the vehicle.

When the driver assistance apparatus according to the embodiment of the present invention provides the videos of the vicinity of the vehicle, the driver assistance apparatus may provide a notification of a specific object. Instead of a user, the driver assistance apparatus measures a part that needs the user's specific attention and notifies the user of the measuring result, thereby providing a way to more conveniently drive.

Referring to FIG. 2, such a driver assistance apparatus 100 may include an input unit 110, a communication unit 120, an interface 130, a memory 140, a sensor unit 155, a processor 170, a display unit 180, an audio output unit 185 and a power supply 190. The units of the driver assistance apparatus 100 shown in FIG. 2 are not essential to implementation of the driver assistance apparatus 100 and thus the driver assistance apparatus 100 described in the present specification may have components greater or less in number than the number of the above-described components.

Each component will now be described in detail. The driver assistance apparatus 100 may include the input unit 110 for receiving user input.

For example, a user may input a signal for setting a driver assistance function provided by the driver assistance apparatus 100 or an execution signal for turning the driver assistance apparatus 100 on/off.

The input unit 110 may include at least one of a gesture input unit (e.g., an optical sensor, etc.) for sensing a user gesture, a touch input unit (e.g., a touch sensor, a touch key, a push key (mechanical key), etc.) for sensing touch and a microphone for sensing voice input and receive user input.

Next, the driver assistance apparatus 100 may include the communication unit 120 for communicating with another vehicle 510, a terminal 600 and a server 500.

The driver assistance apparatus 100 may receive communication information including at least one of navigation information, driving information of another vehicle and traffic information via the communication unit 120. In contrast, the driver assistance apparatus 100 may transmit information on this vehicle via the communication unit 120.

In detail, the communication unit 120 may receive at least one of position information, weather information and road traffic condition information (e.g., transport protocol experts group (TPEG), etc.) from the mobile terminal 600 and/or the server 500.

The communication unit 120 may receive traffic information from the server 500 having an intelligent traffic system (ITS). Here, the traffic information may include traffic signal information, lane information, vehicle surrounding information or position information.

In addition, the communication unit 120 may receive navigation information from the server 500 and/or the mobile terminal 600. Here, the navigation information may include at least one of map information related to vehicle driving, lane information, vehicle position information, set destination information and route information according to the destination.

For example, the communication unit 120 may receive the real-time position of the vehicle as the navigation information. In detail, the communication unit 120 may include a global positioning system (GPS) module and/or a Wi-Fi (Wireless Fidelity) module and acquire the position of the vehicle.

In addition, the communication unit 120 may receive driving information of the other vehicle 510 from the other vehicle 510 and transmit information on this vehicle, thereby sharing driving information between vehicles. Here, the shared driving information may include vehicle traveling direction information, position information, vehicle speed information, acceleration information, moving route information, forward/reverse information, adjacent vehicle information and turn signal information.

In addition, when a user rides in the vehicle, the mobile terminal 600 of the user and the driver assistance apparatus 100 may pair with each other automatically or by executing a user application.

The communication unit 120 may exchange data with the other vehicle 510, the mobile terminal 600 or the server 500 in a wireless manner.

In detail, the communication unit 120 can perform wireless communication using a wireless data communication method. As the wireless data communication method, technical standards or communication methods for mobile communications (for example, Global System for Mobile Communication (GSM), Code Division Multiple Access (CDMA), CDMA2000 (Code Division Multiple Access 2000), EV-DO (Evolution-Data Optimized), Wideband CDMA (WCDMA), High Speed Downlink Packet Access (HSDPA), HSUPA (High Speed Uplink Packet Access), Long Term Evolution (LTE), LTE-A (Long Term Evolution-Advanced), and the like) may be used.

The communication unit 120 is configured to facilitate wireless Internet technology. Examples of such wireless Internet technology include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like.

In addition, the communication unit 120 is configured to facilitate short-range communication. For example, short-range communication may be supported using at least one of Bluetooth™, Radio Frequency IDentification (RFID), Infrared Data Association (IrDA), Ultra-Wideband (UWB), ZigBee, Near Field Communication (NFC), Wireless-Fidelity (Wi-Fi), Wi-Fi Direct, Wireless USB (Wireless Universal Serial Bus), and the like.

In addition, the driver assistance apparatus 100 may pair with the mobile terminal located inside the vehicle using a short-range communication method and wirelessly exchange data with the other vehicle 510 or the server 500 using a long-distance wireless communication module of the mobile terminal.

Next, the driver assistance apparatus 100 may include the interface 130 for receiving data of the vehicle and transmitting a signal processed or generated by the processor 170.

In detail, the driver assistance apparatus 100 may receive at least one of driving information of another vehicle, navigation information and sensor information via the interface 130.

In addition, the driver assistance apparatus 100 may transmit a control signal for executing a driver assistance function or information generated by the driver assistance apparatus 100 to the controller 770 of the vehicle via the interface 130.

To this end, the interface 130 may perform data communication with at least one of the controller 770 of the vehicle, an audio-video-navigation (AVN) apparatus 400 and the sensing unit 760 using a wired or wireless communication method.

In detail, the interface 130 may receive navigation information by data communication with the controller 770, the AVN apparatus 400 and/or a separate navigation apparatus.

In addition, the interface 130 may receive sensor information from the controller 770 or the sensing unit 760.

Here, the sensor information may include at least one of vehicle traveling direction information, vehicle position information, vehicle speed information, acceleration information, vehicle tilt information, forward/reverse information, fuel information, information on a distance from a preceding/rear vehicle, information on a distance between a vehicle and a lane and turn signal information, etc.

The sensor information may be acquired from a heading sensor, a yaw sensor, a gyro sensor, a position module, a vehicle forward/reverse sensor, a wheel sensor, a vehicle speed sensor, a vehicle tilt sensor, a battery sensor, a fuel sensor, a tire sensor, a steering sensor based on rotation of the steering wheel, a vehicle interior temperature sensor, a vehicle interior humidity sensor, a door sensor, etc. The position module may include a GPS module for receiving GPS information.

The interface 130 may receive user input via the user input unit 110 of the vehicle.

The interface 130 may receive user input from the input unit of the vehicle or via the controller 770. That is, when the input unit is provided in the vehicle, user input may be received via the interface 130.

In addition, the interface 130 may receive traffic information acquired from the server. The server 500 may be located at a traffic control surveillance center for controlling traffic. For example, when traffic information is received from the server 500 via the communication unit 120 of the vehicle, the interface 130 may receive traffic information from the controller 770.

Next, the memory 140 may store a variety of data for overall operation of the driver assistance apparatus 100, such as a program for processing or control of the controller 770.

The memory 140 may store data related to a reference speed of objects and data related to a reference distance between the vehicle and the objects, which are references for displaying a warning message at the time of changing a lane.

In addition, the memory 140 may store data and commands for operation of the driver assistance apparatus 100 and a plurality of application programs or applications executed in the driver assistance apparatus 100. At least some of such application programs may be downloaded from an external server through wireless communication. At least one of such application programs may be installed in the driver assistance apparatus 100 upon release, in order to provide the basic function (e.g., the driver assistance information guide function) of the driver assistance apparatus 100.

Such application programs may be stored in the memory 140 and may be executed to perform operation (or function) of the driver assistance apparatus 100 by the processor 170.

The memory 140 may store data for checking an object included in an image. For example, the memory 140 may store data for checking a predetermined object using a predetermined algorithm when the predetermined object is detected from an image of the vicinity of the vehicle acquired through the camera 160.

For example, the memory 140 may store data for checking the object using the predetermined algorithm when the predetermined algorithm such as a lane, a traffic sign, a two-wheeled vehicle and a pedestrian is included in an image acquired through the camera 160.

The memory 140 may be implemented in a hardware manner using at least one selected from among a flash memory, a hard disk, a solid state drive (SSD), a silicon disk drive (SDD), a micro multimedia card, a card type memory (e.g., an SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk and an optical disc.

In addition, the driver assistance apparatus 100 may operate in association with a network storage for performing a storage function of the memory 140 over the Internet.

Next, the monitoring unit may acquire information on the internal state of the vehicle.

Information sensed by the monitoring unit may include at least one of facial recognition information, fingerprint information, iris-scan information, retina-scan information, hand geometry information and voice recognition information. The motoring unit may include other sensors for sensing such biometric information.

Next, the driver assistance apparatus 100 may further include the sensor unit 155 for sensing objects located in the vicinity of the vehicle. The driver assistance apparatus 100 may include the sensor unit 155 for sensing peripheral objects and may receive the sensor information obtained by the sensing unit 760 of the vehicle via the interface 130. The acquired sensor information may be included in the information on the vehicle surrounding information.

The sensor unit 155 may include at least one of a distance sensor 150 for sensing the position of an object located in the vicinity of the vehicle and a camera 160 for capturing the image of the vicinity of the vehicle.

First, the distance sensor 150 may accurately sense the position of the object located in the vicinity of the vehicle, a distance between the object and the vehicle, a movement direction of the object, etc. The distance sensor 150 may continuously measure the position of the sensed object to accurately sense change in positional relationship with the vehicle.

The distance sensor 150 may sense the object located in at least one of the front, rear, left and right areas of the vehicle. The distance sensor 150 may be provided at various positions of the vehicle.

In detail, referring to FIG. 3, the distance sensor 150 may be provided at at least one of the front, rear, left and right sides and ceiling of the vehicle.

The distance sensor 150 may include at least one of various distance measurement sensors such as a Lidar sensor, a laser sensor, an ultrasonic wave sensor and a stereo camera.

For example, the distance sensor 150 is a laser sensor and may accurately measure a positional relationship between the vehicle and the object using a time-of-flight (TOF) and/or a phase-shift method according to a laser signal modulation method.

Information on the object may be acquired by analyzing the image captured by the camera 160 at the processor 170.

In detail, the driver assistance apparatus 100 may capture the image of the vicinity of the vehicle using the camera 160, analyze the image of the vicinity of the vehicle using the processor 170, detect the object located in the vicinity of the vehicle, determine the attributes of the object and generate sensor information.

The image information is at least one of the type of the object, traffic signal information indicated by the object, the distance between the object and the vehicle and the position of the object and may be included in the sensor information.

In detail, the processor 170 may detect the object from the captured image via image processing, track the object, measure the distance from the object, and check the object to analyze the object, thereby generating image information.

The camera 160 may be provided at various positions.

In detail, the camera 160 may include an internal camera 160f for capturing an image of the front side of the vehicle within the vehicle and acquiring a front image.

Referring to FIG. 3, a plurality of cameras 160 may be provided at least one of the front, rear, right and left and ceiling of the vehicle.

In detail, the left camera 160b may be provided inside a case surrounding a left side mirror. Alternatively, the left camera 160b may be provided outside the case surrounding the left side mirror. Alternatively, the left camera 160b may be provided in one of a left front door, a left rear door or an outer area of a left fender.

The right camera 160c may be provided inside a case surrounding a right side mirror. Alternatively, the right camera 160c may be provided outside the case surrounding the right side mirror. Alternatively, the right camera 160c may be provided in one of a right front door, a right rear door or an outer area of a right fender.

In addition, the rear camera 160d may be provided in the vicinity of a rear license plate or a trunk switch. The front camera 160a may be provided in the vicinity of an emblem or a radiator grill.

The processor 170 may synthesize images captured in all directions and provide an around view image viewed from the top of the vehicle. Upon generating the around view image, boundary portions between the image regions occur. Such boundary portions may be subjected to image blending for natural display.

In addition, the ceiling camera 160e may be provided on the ceiling of the vehicle to capture the image of the vehicle in all directions.

The camera 160 may directly include an image sensor and an image processing module. The camera 160 may process a still image or a moving image obtained by the image sensor (e.g., CMOS or CCD). In addition, the image processing module processes the still image or the moving image acquired through the image sensor, extracts necessary image information, and delivers the extracted image information to the processor 170.

In order to enable the processor 170 to more easily perform object analysis, in the embodiment, the camera 160 may be a stereo camera for capturing an image and, at the same time, measuring a distance from an object.

The sensor unit 155 may be a stereo camera including the distance sensor 150 and the camera 160. That is, the stereo camera may acquire an image and, at the same time, sense a positional relationship with the object.

Hereinafter, referring to FIGS. 4 to 6, the stereo camera and a method of detecting image information by the processor 170 using the stereo camera will be described in greater detail.

First, referring to FIG. 4, the stereo camera 160 may include a first camera 160a including a first lens 163a and a second camera 160b including a second lens 163b.

The driver assistance apparatus 100 may further include first and second light shield units 162a and 162b for shielding light incident upon the first and second lenses 163a and 163b.

The driver assistance apparatus 100 may acquire stereo images of the vicinity of the vehicle from the first and second cameras 160a and 160b, detect disparity based on the stereo images, detect an object from at least one stereo image, and continuously track movement of the object after object detection.

Referring to FIG. 5, as one example of the block diagram of the internal configuration of the processor 170, the processor 170 of the driver assistance apparatus 100 may include an image preprocessor 410, a disparity calculator 420, an object detector 434, an object tracking unit 440 and an application unit 450. Although an image is processed in order of the image preprocessor 410, the disparity calculator 420, the object detector 434, the object tracking unit 440 and the application unit 450 in FIG. 5 and the following description, the present invention is not limited thereto.

The image preprocessor 410 may receive an image from the camera 160 and perform preprocessing.

In detail, the image preprocessor 410 may perform noise reduction, rectification, calibration, color enhancement, color space conversion (CSC), interpolation, camera gain control, etc. of the image. An image having definition higher than that of the stereo image captured by the camera 160 may be acquired.

The disparity calculator 420 may receive the images processed by the image preprocessor 410, perform stereo matching of the received images, and acquire a disparity map according to stereo matching. That is, disparity information of the stereo image of the front side of the vehicle may be acquired.

At this time, stereo matching may be performed in units of pixels of the stereo images or predetermined block units. The disparity map may refer to a map indicating the numerical value of binocular parallax information of the stereo images, that is, the left and right images.

The segmentation unit 432 may perform segmentation and clustering with respect to at least one image based on the disparity information from the disparity calculator 420.

In detail, the segmentation unit 432 may segment at least one stereo image into a background and a foreground based on the disparity information.

For example, an area in which the disparity information is less than or equal to a predetermined value within the disparity map may be calculated as the background and excluded. Therefore, the foreground may be segmented. As another example, an area in which the disparity information is greater than or equal to a predetermined value within the disparity map may be calculated as the foreground and extracted. Therefore, the foreground may be segmented.

The background and the foreground may be segmented based on the disparity information extracted based on the stereo images to reduce signal processing speed, the amount of processed signals, etc. upon object detection.

Next, the object detector 434 may detect the object based on the image segment from the segmentation unit 432.

That is, the object detector 434 may detect the object from at least one image based on the disparity information.

In detail, the object detector 434 may detect the object from at least one image. For example, the object may be detected from the foreground segmented by image segmentation.

Next, the object verification unit 436 may classify and verify the segmented object.

To this end, the object verification unit 436 may use an identification method using a neural network, a support vector machine (SVM) method, an identification method by AdaBoost using Haar-like features or a histograms of oriented gradients (HOG) method.

The object verification unit 436 may compare the objects stored in the memory 140 and the detected object and verify the object.

For example, the object verification unit 436 may verify a peripheral vehicle, a lane, a road surface, a traffic sign, a danger zone, a tunnel, etc. located in the vicinity of the vehicle.

The object tracking unit 440 may track the verified object. For example, the objects in the sequentially acquired stereo images may be verified, motion or motion vectors of the verified objects may be calculated and motion of the objects may be tracked based on the calculated motion or motion vectors. A peripheral vehicle, a lane, a road surface, a traffic sign, a danger zone, a tunnel, etc. located in the vicinity of the vehicle may be tracked.

Next, the application unit 450 may calculate a degree of risk, etc. based on various objects located in the vicinity of the vehicle, for example, another vehicle, a lane, a road surface, a traffic sign, etc. In addition, possibility of collision with a preceding vehicle, whether a vehicle slips, etc. may be calculated.

The application unit 450 may output a message indicating such information to the user as driver assistance information based on the calculated degree of risk, possibility of collision or slip. Alternatively, a control signal for vehicle attitude control or driving control may be generated as vehicle control information.

The image preprocessor 410, the disparity calculator 420, the segmentation unit 432, the object detector 434, the object verification unit 436, the object tracking unit 440 and the application unit 450 may be included in the image processor (see FIG. 31) of the processor 170.

In some embodiments, the processor 170 may include only some of the image preprocessor 410, the disparity calculator 420, the segmentation unit 432, the object detector 434, the object verification unit 436, the object tracking unit 440 and the application unit 450. If the camera 160 includes a mono camera 160 or an around view camera 160, the disparity calculator 420 may be excluded. In some embodiments, the segmentation unit 432 may be excluded.

Referring to FIG. 6, during a first frame period, the camera 160 may acquire stereo images.

The disparity calculator 420 of the processor 170 receives stereo images FR1a and FR1b processed by the image preprocessor 410, performs stereo matching with respect to the stereo images FR1a and FR1b and acquires a disparity map 520.

The disparity map 520 indicates the levels of binocular parallax between the stereo images FR1a and FR1b. As a disparity level increases, a distance from a vehicle may decrease and, as the disparity level decreases, the distance from the vehicle may increase.

When such a disparity map is displayed, luminance may increase as the disparity level increases and decrease as the disparity level decreases.

In the figure, disparity levels respectively corresponding to first to fourth lanes 528a, 528b, 528c and 528d and disparity levels respectively corresponding to a construction area 522, a first preceding vehicle 524 and a second preceding vehicle 526 are included in the disparity map 520.

The segmentation unit 432, the object detector 434 and the object verification unit 436 may perform segmentation, object detection and object verification with respect to at least one of the stereo images FR1a and FR1b based on the disparity map 520.

In the figure, object detection and verification are performed with respect to the second stereo image FR1b using the disparity map 520.

That is, object detection and verification are performed with respect to the first to fourth lanes 538a, 538b, 538c and 538d, the construction area 532, the first preceding vehicle 534 and the second preceding vehicle 536 of the image 530.

With image processing, the driver assistance apparatus 100 may acquire various surrounding information of the vehicle, such as peripheral objects or the positions of the peripheral objects, using the sensor unit 155, as sensor information.

Next, the driver assistance apparatus 100 may further include a display unit for displaying a graphic image of the driver assistance function.

The display unit 180 may display a drive guide video. Alternatively, the display unit 180 may display a top-view video. Alternatively, the display unit 180 may display both the drive guide video and the top-view video.

The display unit 180 may include a plurality of displays.

In detail, the display unit 180 may include a first display 180a for projecting and displaying a graphic image onto and on a vehicle windshield W. That is, the first display 180a is a head up display (HUD) and may include a projection module for projecting the graphic image onto the windshield W. The graphic image projected by the projection module may have predetermined transparency. Accordingly, a user may simultaneously view the front and rear sides of the graphic image.

The graphic image may overlap the image projected onto the windshield W to achieve augmented reality (AR).

The display unit may include a second display 180b separately provided inside the vehicle to display an image of the driver assistance function.

In detail, the second display 180b may be a display of a vehicle navigation apparatus or a cluster located at an internal front side of the vehicle.

The second display 180b may include at least one selected from among a Liquid Crystal Display (LCD), a Thin Film Transistor LCD (TFT LCD), an Organic Light Emitting Diode (OLED), a flexible display, a 3D display, and an e-ink display.

The second display 180b may be combined with a gesture input unit to achieve a touchscreen.

Next, the audio output unit 185 may audibly output a message for explaining the function of the driver assistance apparatus 100 and checking whether the driver assistance function is performed. That is, the driver assistance apparatus 100 may provide explanation of the function of the driver assistance apparatus 100 via visual display of the display unit 180 and audio output of the audio output unit 185.

Next, the haptic output unit may output an alarm for the driver assistance function in a haptic manner. For example, the driver assistance apparatus 100 may output vibration to the user when a warning is included in at least one of navigation information, traffic information, communication information, vehicle state information, advanced driver assistance system (ADAS) function and other driver convenience information.

The haptic output unit may provide directional vibration. For example, the haptic output unit may be provided in a steering apparatus for controlling steering to output vibration. Left or right vibration may be output according to the left and right sides of the steering apparatus to enable directional haptic output.

In addition, the power supply 190 may receive power and supply power necessary for operation of the components under control of the processor 170.

Lastly, the driver assistance apparatus 100 may include the processor 170 for controlling overall operation of the units of the driver assistance apparatus 100.

In addition, the processor 170 may control at least some of the components described with reference to FIG. 3 in order to execute the application program. Further, the processor 170 may operate by combining at least two of the components included in the driver assistance apparatus 100es, in order to execute the application program.

The processor 170 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors 170, and electric units for the implementation of other functions.

The processor 170 may be controlled by the controller or may control various functions of the vehicle through the controller.

The processor 170 may control overall operation of the driver assistance apparatus 100 in addition to operation related to the application programs stored in the memory 140. The processor 170 may process signals, data, information, etc. via the above-described components or execute the application programs stored in the memory 140 to provide appropriate information or functions to the user.

Next, a method of providing a drive guide video through a driver assistance apparatus according to an embodiment of the present invention will be described with reference to FIG. 8.

FIG. 8 is a flowchart illustrating the method of providing the driving guide image through the driver assistance apparatus according to the embodiment of the present invention.

A plurality of cameras 160 may capture one or more videos of the vicinity of a vehicle (S101).

The driver assistance apparatus 100 may include the plurality of cameras 160. For example, the driver assistance apparatus 100 may include two or three cameras 160. However, this is merely an example, and the present invention is not limited thereto. As the driver assistance apparatus 100 includes more cameras 160, the driver assistance apparatus 100 may provide a more detailed video. In addition, the plurality of cameras 160 included in the driver assistance apparatus 100 may be located adjacent to one another or be spaced apart from one another. A position type of the cameras 160 of the driver assistance apparatus 100 may vary.

Next, positions of the plurality of cameras 160 included in the driver assistance apparatus 100 according to the embodiment of the present invention will be described with reference to FIGS. 9 to 12.

FIG. 9 is a diagram illustrating positions of a plurality of cameras included in a driver assistance apparatus according to a first embodiment of the present invention.

According to the first embodiment of the present invention, the driver assistance apparatus 100 may include three cameras 160. Specifically, the driver assistance apparatus 100 according to the first embodiment of the present invention may include a first camera, a second camera, and a third camera. According to the first embodiment of the present invention, the first camera, the second camera, and the third camera of the driver assistance apparatus 100 may be located in a front right area 901, a front left area 902, and a rear central area 903 of a vehicle 700, respectively.

In this case, a wide angle of the first camera may be equal to that of the second camera. In addition, a wide angle of the third camera may be greater than that of the first camera or the second camera, FIG. 10 is a diagram illustrating positions of a plurality of cameras included in a driver assistance apparatus according to a second embodiment of the present invention.

According to the second embodiment of the present invention, similar to the driver assistance apparatus 100 illustrated in FIG. 9, the driver assistance apparatus 100 may include a first camera, a second camera, and a third camera. According to the second embodiment of the present invention, the first camera, the second camera, and the third camera of the driver assistance apparatus 100 may be located in a front right area 901, a front left area 902, and a front central area 904 of a vehicle 700, respectively.

A video captured by the driver assistance apparatus 100 according to the second embodiment of the present invention may be similar to a video captured by the driver assistance apparatus 100 according to the first embodiment. The positions of the plurality of cameras according to the first embodiment or the second embodiment may be selected according to a design of the vehicle 700 or a wide angle of the camera 160.

FIG. 11 is a diagram illustrating positions of a plurality of cameras included in a driver assistance apparatus according to a third embodiment of the present invention.

According to the third embodiment of the present invention, the driver assistance apparatus 100 may include two cameras 160. For example, the driver assistance apparatus 100 according to the third embodiment of the present invention may include a first camera and a second camera. According to the third embodiment of the present invention, the first camera and the second camera of the driver assistance apparatus 100 may be located in a rear right area 903*a* and a rear left area 903*b* of a vehicle 700, respectively.

In this case, there is an advantage in that a camera does not need to be located on a side surface of the vehicle.

FIG. 12 is a diagram illustrating positions of a plurality of cameras included in a driver assistance apparatus according to a fourth embodiment of the present invention.

According to the fourth embodiment of the present invention, the driver assistance apparatus 100 may include four cameras 160. For example, the driver assistance apparatus 100 according to the fourth embodiment of the present invention may include a first camera, a second camera, a third camera, and a fourth camera. According to the fourth embodiment of the present invention, the first camera, the second camera, the third camera, and the fourth camera of the driver assistance apparatus 100 may be located in a front right area 901, a front left area 902, a rear right area 903*a*, and a rear left area 903*b* of a vehicle 700, respectively.

In this case, a more detailed drive guide video may be provided compared to the driver assistance apparatuses according to the first to third embodiments.

Since the positions of the plurality of cameras described through FIGS. 9 to 12 are merely an example, it is reasonable that the number and the positions of the cameras are not limited thereto.

Each of the plurality of cameras described through FIGS. 9 to 12 may capture a video of the vicinity thereof. For example, the camera 160 located in the front right area 901 may capture a video including objects which approach the right of the vehicle 700. In the same manner, the camera 160 located in the front left area 902 may capture a video including objects which approach the left of the vehicle 700. The cameras 160 located in the rear central area 903 and the front central area 904 may mostly capture a video including objects which are located in the rear of the vehicle 700. When two cameras 160 are respectively located in the rear right area 903a and the rear left area 903b, it is possible to capture the video including the objects located in the rear of the vehicle 700 in more detail and accurately. As described above, the videos captured by the cameras 160 located in various areas of the vehicle 700 may mean videos of the vicinity of the vehicle.

Next, videos of the vicinity of a vehicle captured by the plurality of cameras 160 provided in the driver assistance apparatus 100 according to an embodiment of the present invention will be described with reference to FIGS. 13A to 13C.

FIGS. 13A to 13C are illustrative diagrams of videos of the vicinity of the vehicle captured by the plurality of cameras provided in the driver assistance apparatus according to the embodiment of the present invention.

Specifically, FIG. 13A may be an example of a video of the vicinity of the vehicle captured in the front right area 901 of the vehicle 700. FIG. 13B may be an example of a video of the vicinity of the vehicle captured in the rear central area 903 of the vehicle 700. FIG. 13C may be an example of a video of the vicinity of the vehicle captured in the front left area 902 of the vehicle 700.

Again, FIG. 8 is described.

The processor 170 may acquire an image corresponding to a stitching region from the captured videos of the vicinity of the vehicle (S103).

The stitching region may mean an overlap region of videos when a plurality of videos are synthesized. The driver assistance apparatus 100 according to the embodiment of the present invention may fix the stitching region. For example, the processor 170 may set, as a first stitching region, an overlap region of a video of the vicinity of the vehicle captured by the camera located in the front right area 901 and a video of the vicinity of the vehicle captured by the camera located in the rear central area 903. In the same manner, the processor 170 may set, as a second stitching region, an overlap region of a video of the vicinity of the vehicle captured by the camera located in the front left area 902 and a video of the vicinity of the vehicle captured by the camera located in the rear central area 903. Therefore, the processor 170 may acquire the image corresponding to the stitching region from the videos of the vicinity of the vehicle based on the set stitching region.

Next, a method of acquiring an image corresponding to a stitching region from videos of the vicinity of a vehicle through a driver assistance apparatus 100 according to an embodiment of the present invention will be described with reference to FIG. 14.

FIG. 14 is an illustrative diagram for describing a method of acquiring the image corresponding to the stitching region from videos of the vicinity of the vehicle through the driver assistance apparatus according to the embodiment of the present invention.

As shown in FIG. 14, the processor 170 may set, as a stitching region, a first region 1401 and a second region 1402 of a video 1400 of the vicinity of the vehicle captured by the camera 160 located in the rear central area 903. Therefore, although the video, which is captured by the camera 160 located in the rear central area 903, varies, the processor 170 may recognize the first region 1401 and the second region 1402 as the stitching region. The processor 170 may acquire an image of the first region 1401 and an image of the second region 1402 of the video 1400 captured by the camera 160 located in the rear central area 903 as the image corresponding to the stitching region. The first region 1401 and the second region 1402 are an example, and the stitching region may correspond to other portions of a video. The processor 170 may set the stitching region based on a wide angle of each of the plurality of cameras and an analysis result of a video captured by each of the plurality of cameras.

Again, FIG. 8 is described.

The processor 170 may acquire an edge of an object included in the image corresponding to the stitching region (S105).

First, the processor 170 may detect the acquired object included in the image corresponding to the stitching region. The processor 170 has acquired the image of the first region 1401 and the image of the second region 1402 as the image corresponding to the stitching region in an example of FIG. 14. The processor 170 may detect an object included in the image of the first region 1401 and an object included in the image of the second region 1402.

An object according to an embodiment of the present invention may include a car, a motorcycle, a bicycle, and a human, but theses are merely an example. In addition, the object according to the embodiment of the present invention may include a partial image of the car, the motorcycle, the bicycle, or the human. Therefore, the processor 170 may detect an object only with a partial image thereof rather than a whole image thereof. That is, a corresponding image may be detected only with a partial image thereof rather than a whole image thereof.

According to an embodiment of the present invention, the processor 170 may detect an object by using a method of comparing a partial image included in a video with an image of each of objects included in the memory 140. For example, a partial image of a video may be compared with an image of a car included in the memory 140, and when it is detected that the partial image of the video matches a partial image of the car as the comparison result, it may be recognized that the car is included in the partial image.

Alternatively, it may be detected through a size or a speed of an object included in a video what is the object. For example, when a size of an object is equal to or greater than a certain criterion, the object may be detected as being a bus, when a size of an object is less than the certain criterion, the object may be detected as being a motorcycle, and when a size of an object corresponds to the other sizes, the object may be detected as being a car. Alternatively, a speed of an object is equal to or greater than a certain criterion, the object may be detected as being a car, and when a speed of an object is less than the certain criterion, the object may be determined as being a bicycle. In addition, a method of detecting an object may be performed through a prior art.

Next, an operation of acquiring an edge of an object included in an image corresponding to a stitching region through the driver assistance apparatus 100 according to an embodiment of the present invention will be described with reference to FIG. 15.

FIG. 15 is a diagram for describing an operation of acquiring the edge of the object included in the image corresponding to the stitching region through the driver assistance apparatus according to the embodiment of the present invention.

The processor 170 may detect a car in the image of the first region 1401 and a car in the image of the second region 1402, which are the image corresponding to the stitching region.

The processor 170 may extract an edge of a detected object. The detected object includes both a whole image and a partial image of an object. Specifically, the processor 170 may extract a first edge 1501 of the car detected in the image of the first region 1401 and a second edge 1502 of the car detected in the image of the second region 1402.

According to an embodiment of the present invention, the processor 170 may acquire an edge of an object by using a canny edge extraction method. According to the canny edge extraction method, the processor 170 may remove a noise by blurring videos, detect edges by using a mask edge, remove a non-maximum value, distinguish sizes by using a double threshold to connect the edges, and acquire the edges of objects.

According to another embodiment of the present invention, the processor 170 may acquire an edge by using the fact that a brightness change rate is high in an edge region of an object. Specifically, an object may be acquired through an operation of selecting a difference between adjacent pixels with respect to respective pixels constituting a video. Since the aforementioned edge extract method is merely an example, an object may be extracted through a prior art.

Again, FIG. 8 is described.

The processor 170 may synthesize videos of the vicinity of the vehicle into one video, except for the mage corresponding to the stitching region (S107).

The processor 170 may synthesize videos captured by the plurality of cameras 160 into one video. For example, the processor 170 may synthesize the videos of the vicinity of the vehicle, i.e., a video of FIG. 13A, a video of FIG. 13B, and a video of FIG. 13C into one video. At this time, the processor 170 may synthesize the videos of the vicinity of the vehicle into one video, except for an image corresponding to the first region 1401 and an image corresponding to the second region 1402, which are the image corresponds to the stitching region. This is to remove an overlap portion of the videos of the vicinity of the vehicle.

FIG. 16 is an illustrative diagram of a video acquired by synthesizing videos of the vicinity of a vehicle into one video, except for an image corresponding to a stitching region according to an embodiment of the present invention.

As the image corresponding to the stitching region is removed, video cutting regions 1601 and 1602 may be present in a synthetic video 1600 shown in FIG. 16.

Again, FIG. 8 is described.

The processor 170 may display the synthetic video 1600 and the first and second edges 1501 and 1502 of the acquired objects together (S109).

In order to solve limitations in the video cutting regions 1601 and 1602 capable of being present in the synthetic video 1600 of operation S107, the processor 170 may display the synthetic video and the edges of the objects together.

FIG. 17 is a diagram for describing a state in which a synthetic video and an edge of an object are displayed together by a driver assistance apparatus according to an embodiment of the present invention.

The display unit 180 may synthesize and display the synthetic video 1600 and edges 1701 and 1702 of objects. The processor 170 may display the edges 1701 and 1702 of the objects in a portion corresponding to a stitching region in the synthetic video 1600. Alternatively, the processor 170 may detect an object in the synthetic video 1600, which matches shapes of each of the edges 1701 and 1702 of the objects, and may display the edges 1701 and 1702 of the objects in a corresponding portion. In addition, when the processor 170 synthesizes and displays the synthetic video 1600 and the edges 1701 and 1702 of the objects, the processor 170 may further display images inside of the edges 1701 and 1702 of the objects. For example, when the processor 170 extracts edges of objects, the processor 170 may extract the images inside of the edges of the objects together with the edges 1701 and 1702 of the objects. The processor 170 may generate a more natural video by displaying the images inside of the edges (not shown) and the edges 1701 and 1702 of the objects together in the synthetic video 1600.

When the driver assistance apparatus provides a drive guide video through the aforementioned method, it is possible to fix a stitching region of a video. When the stitching region of the video continuously moves, a movement of objects may become unnatural. In addition, when the stitching region of the video abruptly moves, a driver may be prevented from concentrating on driving. Therefore, there is an advantage in that the aforementioned limitations are solvable by fixing the stitching region as in the present invention. In order to describe such an advantage, the synthetic video generating method described through FIGS. 13 to 17 will be described again with reference to FIGS. 18 to 22 by exemplifying other videos.

FIGS. 18A to 18C are other illustrative diagrams of videos of the vicinity of a vehicle captured by a plurality of cameras included in a driver assistance apparatus according to an embodiment of the present invention.

In particular, the videos of the vicinity of the vehicle in FIGS. 18A to 18C may be videos captured when a certain time passes after the videos of FIGS. 13A to 13C are captured.

Therefore, the video of FIG. 18A may be a video captured when the certain time passes after the video of the 13A is captured, the video of FIG. 18B may be a video captured when the certain time passes after the video of the 13B is captured, and the video of FIG. 18C may be a video captured when the certain time passes after the video of the 13C is captured.

FIG. 19 is another illustrative diagram for describing a method of acquiring an image corresponding to a stitching region from videos of the vicinity of a vehicle through a driver assistance apparatus according to an embodiment of the present invention.

As shown in FIG. 19, the processor 170 may acquire an image of a first region 1901 and an image of a second region 1902 in a video 1900 of the vicinity of the vehicle captured by the camera 160 located in the rear central area 903 as the image corresponding to the stitching region.

FIG. 20 is another illustrative diagram for describing an operation of acquiring an edge of an object included in an image corresponding to a stitching region through a driver assistance apparatus according to an embodiment of the present invention.

The processor 170 may detect that two partial images of cars are present in the first region 1901, and one partial image of a car is preset in the second region 1902. As shown in FIG. 20, the processor 170 may acquire a first edge 2001 and a second edge 2002 in the images of the first region 1901 and a third edge 2003 in the image of the second region 1902.

FIG. 21 is another illustrative diagram of a video acquired by synthesizing videos of the vicinity of a vehicle into one video, except for an image corresponding to a stitching region according to an embodiment of the present invention.

Specifically, the processor 170 may connect the video of FIG. 18A, the videos except for the images corresponding to the stitching regions 1901 and 1902, and the video of FIG. 18C to synthesize the connected videos into one video. The video acquired by synthesizing the connected video into one video may be a video as shown in FIG. 21. A synthetic video 2100 as shown in FIG. 21 may include video cutting regions 2101 and 2102.

FIG. 22 is another illustrative diagram for describing a state in which a synthetic video and an edge of an object are displayed together by a driver assistance apparatus according to an embodiment of the present invention.

In order to solve limitations in the video cutting regions, the processor 170 may overlap and display a synthetic video 2100 and edges 2201, 2202, and 2203 of objects as shown in FIG. 22.

Therefore, when the video shown in FIG. 22 is compared with the video shown in FIG. 17, it may be confirmed that a stitching region of a video is fixed. Therefore, according to the present invention, it is possible to provide a video in which objects naturally move, thereby allowing a user to concentrate on driving.

Next, a drive guide video in a case where a stitching region moves will be described with reference to FIGS. 23A to 27B.

FIGS. 23A to 23C are diagrams illustrating an operation of acquiring an overlap region of videos of the vicinity of a vehicle according to an embodiment of the present invention.

The videos shown in FIGS. 23A to 23C are the same as the videos of the vicinity of the vehicle shown in FIGS. 13A to 13C. The processor 170 may acquire an overlap region by comparing videos of the vicinity of the vehicle. Specifically, the processor 170 may acquire a $(1-a)^{th}$ overlap region 2301, a $(1-b)^{th}$ overlap region 2302, a $(2-a)^{th}$ overlap region 2303, and a $(2-b)^{th}$ overlap region 2304 as an overlap region of videos. At this time, the $(1-a)^{th}$ overlap region 2301 and the $(1-b)^{th}$ overlap region 2302 may mean portions overlapping each other in a captured video. Similarly, the $(2-a)^{th}$ overlap region 2303 and the $(2-b)^{th}$ overlap region 2304 may mean portions overlapping each other in a captured video.

FIG. 24 is an illustrative diagram of a video acquired by overlapping and synthesizing acquired overlap regions.

Specifically, a synthetic video 2400 as shown in FIG. 24 may include a first stitching region 2401 and a second stitching region 2402. The first stitching region 2401 may be a region corresponding to the $(1-a)^{th}$ overlap region 2301 and the $(1-b)^{th}$ overlap region 2302. The second stitching region 2402 may be a region corresponding to the $(2-a)^{th}$ overlap region 2303 and the $(2-b)^{th}$ overlap region 2304.

Next, videos shown in FIGS. 25A to 25C are the same as the videos of the vicinity of the vehicle shown in FIGS. 18A to 18C. The processor 170 may acquire an overlap region by comparing videos of the vicinity of the vehicle. Specifically, the processor 170 may acquire a $(1-a)^{th}$ overlap region 2501, a $(1-b)^{th}$ overlap region 2502, a $(2-a)^{th}$ overlap region 2503, and a $(2-b)^{th}$ overlap region 2504 as an overlap region of videos. At this time, the $(1-a)^{th}$ overlap region 2501 and the $(1-b)^{th}$ overlap region 2502 may mean portions overlapping each other in a captured video. Similarly, the $(2-a)^{th}$ overlap region 2503 and the $(2-b)^{th}$ overlap region 2504 may mean portions overlapping each other in a captured video.

FIG. 26 is another illustrative diagram of a video acquired by overlapping and synthesizing acquired overlap regions.

Specifically, a synthetic video 2600 as shown in FIG. 26 may include a first stitching region 2601 and a second stitching region 2602. The first stitching region 2601 may be a region corresponding to the $(1-a)^{th}$ overlap region 2501 and the $(1-b)^{th}$ overlap region 2502. The second stitching region 2602 may be a region corresponding to the $(2-a)^{th}$ overlap region 2503 and the $(2-b)^{th}$ overlap region 2504.

FIGS. 27A and 27B are diagrams illustrating a comparison between drive guide videos before and after a stitching region moves. In particular, FIG. 27A may be the synthetic video 2400 shown in FIG. 24, and FIG. 27B may be the synthetic video 2600 shown in FIG. 26. A video of 27B may be a video which is captured when a certain time passes after a video of FIG. 27A is captured. A size or a position of stitching regions 2401 and 2402 of FIG. 27A may be different from a size or a position of stitching regions 2601 and 2602 of FIG. 27B. Therefore, the drive guide video is provided through such a method, the stitching region may vary in real time. Accordingly, a movement of a video may be unnatural. This may cause a driver not to concentrate on driving.

Again, FIG. 8 is described.

The driver assistance apparatus 100 may provide a top-view video of a situation of the vicinity of the vehicle viewed from above by using videos of the vicinity of the vehicle. In particular, according to an embodiment of the present invention, the display unit 180 may display the top-view video in operation S109.

The processor 170 may acquire an object included in an overlap region of the videos of the vicinity of the vehicle (S111).

A mean of the object included in the overlap region of the videos of the vicinity of the vehicle will be described with reference to FIG. 28.

FIG. 28 is a diagram illustrating the object included in the overlap region of the videos of the vicinity of the vehicle according to an embodiment of the present invention.

For example, as shown in FIG. 28, a top-view video may include a vehicle icon 2801 indicating a vehicle 700, and a first object icon 2811, a second object icon 2812 and a third object icon 2813, which indicate objects located in the vicinity of the vehicle 700. At this time, both of a camera 160 located in a front right area 901 and a camera 160 located in a rear central area 903 may capture videos including a first overlap region 2822. In addition, both of a camera 160 located in a front left area 902 and the camera 160 located in the rear central area 903 may capture videos including a second overlap region 2821. As described above, an overlap region may mean a region doubly captured by a plurality of cameras. Furthermore, the first object icon 2811 placed in the first overlap region 2822 and the third object icon 2813 placed in the second overlap region 2821 may mean an object placed in an overlap region.

The processor 170 may acquire the object included in the overlap region of the videos of the vicinity of the vehicle by using the same method as a method of detecting an object of a video, which is previously performed so as to acquire the edge of the object in operation S105.

Again, FIG. 8 is described.

The processor 170 may calculate a distance between the objects and the vehicle 700 and a speed of the objects based on information related to the acquired object included in the overlap region (S113).

The object included in the overlap region may be captured by two or more different cameras 160 provided in the driver assistance apparatus 100. The processor 170 may calculate the distance between the vehicle 700 and the objects by using a disparity of the same object included in two or more videos captured by two or more cameras 160. This is a method using properties in which a disparity of an object located close to the vehicle 700 is large, and a disparity of an object located away from the vehicle 700 is small. A detailed calculation method is performed through a prior art.

Next, a method of calculating a speed of objects will be described. The processor 170 may calculate a relative speed of objects by using a distance in which the same object in two or more videos with a time difference is spaced apart from the vehicle 700. In addition, the processor 170 may calculate a speed of each of the objects by adding a relative speed of each of the objects to a speed of the vehicle 700. A detailed calculation method is performed through a prior art.

The processor 170 may generate a top-view video by using the calculated distance and the calculated speed (S115).

The top-view video may be a video of a situation of the vicinity of the vehicle 700 viewed from above. The generated top-view video may include the distance from the objects and the speed of each of the objects existing in the vicinity of the vehicle 700.

The display unit 180 may display the generated top-view video (S117).

Next, a method of displaying a top-view video through the display unit 180 according to an embodiment of the present invention will be described with reference to FIG. 29.

FIG. 29 is a diagram illustrating the top-view video according to an exemplary embodiment. The top-view video may include a vehicle icon 2801 indicating the vehicle 700 and a speed of the vehicle 700. In addition, the top-view video may include object icons 2811 to 2813 placed in the vicinity of the vehicle 700. The top-view video may further include a distance between each of objects and the vehicle 700 and a speed of each of the objects in respect of the objects located in the vicinity of the vehicle 700. In the top-view video shown in FIG. 29, the vehicle icon 2801 indicates that a current speed of the vehicle 700 is 60 km/h, a first object icon 2811 indicates that an object is approaching the rear right side of the vehicle 700 at a speed of 55 km/h at a distance of 70 m from the vehicle 700, a second object icon 2812 indicates that an object is approaching the rear side of the vehicle 700 at a speed of 60 km/h at a distance of 100 m from the vehicle 700, and a third object icon 2813 indicates that an object is approaching the rear left side of the vehicle 700 at a speed of 100 km/h at a distance of 75 m from the vehicle 700.

Again, FIG. 8 is described.

When the processor 170 senses a specific object included in the top-view video (S119), the processor 170 may display a warning message (S121).

The specific object may include a human, a motorcycle, a bicycle, and the like. The specific object may be preset. Alternatively, as the processor 170 receives a command for selecting the specific object, the processor 170 may separately set the specific object that is an object to be sensed. For example, a user may input a command for setting only the motorcycle as the specific object in the driver assistance apparatus 100. The processor 170 may receive a command according to a user input and set only the motorcycle as the specific object.

When the processor 170 senses an object set as the specific object, a warning message may be displayed in the top-view video. Next, a method of displaying a warning message will be described with reference to FIG. 30.

FIG. 30 is a diagram illustrating a method of displaying the warning message as a specific object is sensed by a driver assistance apparatus according to an embodiment of the present invention.

As an object is detected in operation S105 or S111, the processor 170 may detect the specific object. The processor 170 may detect the set specific object. When the processor 170 senses that the specific object is detected, the display unit 180 may display a warning message in the top-view video. The warning message may include at least one of the phrase "THERE IS MOTORCYCLE AROUND. DRIVE SAFELY" 3001 and an object icon 3002. However, this is merely an example, and the warning message may include any phrase as long as the phrase draws a user's attention.

Again, FIG. 8 is described.

When the specific object is not sensed in the top-view video (S119), the processor 170 may sense a lane change operation of the vehicle 700 (S123).

The processor 170 may sense the lane change operation of the vehicle 700. The processor 170 may sense the lane change operation of the vehicle 700 by sensing a movement of wheels 13FL and 13RL of the vehicle 700. Alternatively, the processor 170 may sense the lane change operation by sensing that the vehicle icon 2801 crosses a lane in the top-view video.

When the processor 170 senses the lane change operation of the vehicle (S123), a notification message may be displayed based on the distance between the vehicle and the objects and the speed of the objects (S125).

A method of displaying a notification message according to a lane change of a vehicle according to an embodiment of the present invention will be described with reference to FIG. 31. FIG. 31 is a diagram illustrating a method of displaying the notification message according to the lane change of the vehicle according to an embodiment of the present invention. As shown in FIG. 31, when the processor 170 senses the lane change operation of the vehicle 700, the processor 170 may control the display unit 180 to display a notification message by taking into account a speed of an object located in the rear of a corresponding lane and a distance between the vehicle and the object. Specifically, the memory 140 may store a reference speed of an object and a reference distance, which are references for displaying the notification message at the time of changing a lane. When a lane is changed, the processor 170 may acquire a speed of an object located in the rear of a change lane and a distance between the vehicle and the object and compare the acquired speed and the acquired distance with the reference speed and the reference distance. The processor 170 may control the display unit 180 to or not to display the notification message according to the comparison results. For example, the memory 140 may store data on a case where a speed of an object is 100 km/h or more and a distance from the object is within 50 m, which are references for displaying the notification message. As shown in FIG. 31, when the processor 170 acquires that a speed of an object, which is located in the rear of a lane into which the vehicle 700 is to switch, is 150 km/h, and a distance between the object and the vehicle 700 is a 75 m, the speed of the object deviates from the reference speed. Accordingly, the notification message may be displayed. The notification message may include the message may include the phrase "REAR VEHICLE IS RAPIDLY APPROACHING" 3101. When the speed of the object in the rear of the lane into which the vehicle is to switch and the distance between the vehicle and the object are respectively are within the reference speed and the reference distance, the processor 170 may control the display unit 180 to display the notification phrase "YOU CAN CHANGE LANE" (not shown). Alternatively, When the speed of the object in the rear of the lane into which the vehicle is to switch and the distance between the vehicle and the object are respectively included within the reference speed and the reference distance, the processor 170 may perform control such that any additional phrase is not displayed.

Referring to FIG. 32, the above-described driver assistance apparatus 100 may be included in the vehicle 700.

The vehicle 700 may include a communication unit 710, an input unit 720, a sensing unit 760, an output unit 740, a vehicle drive unit 750, a memory 730, an interface 780, a controller 770, a power supply unit 790, a driver assistance apparatus 100 and AVN apparatus 400. Here, among the units included in the driver assistance apparatus 100 and the units of the vehicle 700, the units having the same names are described as being included in the vehicle 700.

The communication unit 710 may include one or more modules which permit communication such as wireless communication between the vehicle and the mobile terminal 600, between the vehicle and the external server 50 or between the vehicle and the other vehicle 510. Further, the communication unit 710 may include one or more modules which connect the vehicle to one or more networks.

The communication unit 710 includes a broadcast receiving module 711, a wireless Internet module 712, a short-range communication module 713, and an optical communication module 715.

The broadcast receiving module 711 receives a broadcast signal or broadcast related information from an external broadcast management server through a broadcast channel. Here, the broadcast includes a radio broadcast or a TV broadcast.

The wireless Internet module 712 refers to a wireless Internet access module and may be provided inside or outside the vehicle. The wireless Internet module 712 transmits and receives a wireless signal through a communication network according to wireless Internet access technologies.

Examples of such wireless Internet access technologies include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 712 may transmit/receive data according to one or more of such wireless Internet technologies, and other Internet technologies as well. For example, the wireless Internet module 712 may wirelessly exchange data with the external server 500. The wireless Internet module 72 may receive weather information and road traffic state information (e.g., transport protocol experts group (TPEG) information) from the external server 500.

The short-range communication module 713 is configured to facilitate short-range communication. Such short-range communication may be supported using at least one of Bluetooth™, Radio Frequency Identification (RFID), Infrared Data Association (IrDA), Ultra-Wideband (UWB), Zig-Bee, Near Field Communication (NFC), Wireless-Fidelity (Wi-Fi), Wi-Fi Direct, Wireless USB (Wireless Universal Serial Bus), and the like.

The short-range communication module 713 may form a wireless local area network to perform short-range communication between the vehicle and at least one external device. For example, the short-range communication module 713 may wirelessly exchange data with the mobile terminal 600. The short-range communication module 713 may receive weather information and road traffic state information (e.g., transport protocol experts group (TPEG) information) from the mobile terminal 600. When a user rides in the vehicle, the mobile terminal 600 of the user and the vehicle may pair with each other automatically or by executing the application of the user.

A location information module 714 acquires the location of the vehicle and a representative example thereof includes a global positioning system (GPS) module. For example, the vehicle may acquire the location of the vehicle using a signal received from a GPS satellite upon utilizing the GPS module.

The optical communication module 715 may include a light emitting unit and a light reception unit.

The light reception unit may convert a light signal into an electric signal and receive information. The light reception unit may include a photodiode (PD) for receiving light. The photodiode may covert light into an electric signal. For example, the light reception unit may receive information on a preceding vehicle through light emitted from a light source included in the preceding vehicle.

The light emitting unit may include at least one light emitting element for converting electrical signals into a light signal. Here, the light emitting element may be a Light Emitting Diode (LED). The light emitting unit converts electrical signals into light signals to emit the light. For example, the light emitting unit may externally emit light via flickering of the light emitting element corresponding to a prescribed frequency. In some embodiments, the light emitting unit may include an array of a plurality of light emitting elements. In some embodiments, the light emitting unit may be integrated with a lamp provided in the vehicle. For example, the light emitting unit may be at least one selected from among a headlight, a taillight, a brake light, a turn signal, and a sidelight. For example, the optical communication module 715 may exchange data with the other vehicle 510 via optical communication.

The input unit 720 may include a driving operation unit 721, a camera 195, a microphone 723 and a user input unit 724.

The driving operation unit 721 receives user input for driving of the vehicle (see FIG. 2). The driving operation unit 721 may include a steering input unit 721A, a shift input unit 721D, an acceleration input unit 721C and a brake input unit 721B.

The steering input unit 721A is configured to receive user input with regard to the direction of travel of the vehicle. The steering input unit 721A may include a steering wheel using rotation. In some embodiments, the steering input unit 721A may be configured as a touchscreen, a touch pad, or a button.

The shift input unit 721D is configured to receive input for selecting one of Park (P), Drive (D), Neutral (N), and Reverse (R) gears of the vehicle from the user. The shift input unit 721D may have a lever form. In some embodiments, the shift input unit 721D may be configured as a touchscreen, a touch pad, or a button.

The acceleration input unit 721C is configured to receive input for acceleration of the vehicle from the user. The brake input unit 721B is configured to receive input for speed reduction of the vehicle from the user. Each of the acceleration input unit 721C and the brake input unit 721B may have a pedal form. In some embodiments, the acceleration input unit 721C or the brake input unit 721B may be configured as a touchscreen, a touch pad, or a button.

The camera 722 may include an image sensor and an image processing module. The camera 722 may process a still image or a moving image obtained by the image sensor (e.g., CMOS or CCD). In addition, the image processing module processes the still image or the moving image acquired through the image sensor, extracts necessary information, and delivers the extracted information to the controller 770. The vehicle may include the camera 722 for capturing the front image of the vehicle or the image of the vicinity of the vehicle and the monitoring unit 725 for capturing the image of the space inside the vehicle.

The monitoring unit 725 may acquire an image of a passenger. The monitoring unit 725 may acquire an image for biometric information of the passenger.

Although the monitoring unit 725 and the camera 722 are included in the input unit 720 in FIG. X, the camera 722 may be included in the driver assistance apparatus 100 as described above.

The microphone 723 may process external sound signals into electrical data. The processed data may be utilized in various ways according to a function that the vehicle is performing. The microphone 723 may convert a user voice command into electrical data. The converted electrical data may be transmitted to the controller 770.

Meanwhile, in some embodiments, a camera 722 or the microphone 723 may not be included in the input unit 720 but may be included in the sensing unit 760.

The user input unit 724 is configured to receive information from the user. When information is input via the user input unit 724, the controller 770 may control the operation of the vehicle to correspond to the input information. The user input unit 724 may include a touch input unit or a mechanical input unit. In some embodiments, the user input unit 724 may be located in a region of the steering wheel. In this case, the driver may operate the user input unit 724 with the fingers while gripping the steering wheel.

The sensing unit 760 is configured to sense signals associated with, for example, signals related to driving of the vehicle. To this end, the sensing unit 760 may include a collision sensor, a wheel sensor, a speed sensor, tilt sensor, a weight sensor, a heading sensor, a yaw sensor, a gyro sensor, a position module, a vehicle forward/reverse sensor, a battery sensor, a fuel sensor, a tire sensor, a steering sensor based on rotation of the steering wheel, a vehicle interior temperature sensor, a vehicle interior humidity sensor, an ultrasonic sensor, a radar, a Lidar, etc.

As such, the sensing unit 760 may acquire sensing signals with regard to, for example, vehicle collision information, vehicle traveling direction information, vehicle location information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, steering wheel rotation angle information, etc.

Meanwhile, the sensing unit 760 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 760 may include a biometric sensor. The biometric sensor senses and acquires biometric information of the passenger. The biometric information may include fingerprint information, iris-scan information, retina-scan information, hand geometry information, facial recognition information, and voice recognition information. The biometric sensor may include a sensor for sensing biometric information of the passenger. Here, the monitoring unit 725 and the microphone 723 may operate as a sensor. The biometric sensor may acquire hand geometry information and facial recognition information through the monitoring unit 725.

The output unit 740 is configured to output information processed by the controller 770. The output unit 740 may include a display unit 741, a sound output unit 742, and a haptic output unit 743.

The display unit 741 may display information processed by the controller 770. For example, the display unit 741 may display vehicle associated information. Here, the vehicle associated information may include vehicle control information for direct control of the vehicle or driver assistance information for aiding in driving of the vehicle. In addition, the vehicle associated information may include vehicle state information that indicates the current state of the vehicle or vehicle traveling information regarding traveling of the vehicle.

The display unit 741 may include at least one selected from among a Liquid Crystal Display (LCD), a Thin Film Transistor LCD (TFT LCD), an Organic Light Emitting Diode (OLED), a flexible display, a 3D display, and an e-ink display.

The display unit 741 may configure an inter-layer structure with a touch sensor, or may be integrally formed with the touch sensor to implement a touchscreen. The touchscreen may function as the user input unit 724 which provides an input interface between the vehicle and the user and also function to provide an output interface between the vehicle and the user. In this case, the display unit 741 may include a touch sensor which senses a touch to the display unit 741 so as to receive a control command in a touch manner. When a touch is input to the display unit 741 as described above, the touch sensor may sense the touch and the controller 770 may generate a control command corresponding to the touch. Content input in a touch manner may be characters or numbers, or may be, for example, instructions in various modes or menu items that may be designated.

Meanwhile, the display unit 741 may include a cluster to allow the driver to check vehicle state information or vehicle traveling information while driving the vehicle. The cluster may be located on a dashboard. In this case, the driver may check information displayed on the cluster while looking forward.

Meanwhile, in some embodiments, the display unit 741 may be implemented as a head up display (HUD). When the display unit 741 is implemented as a HUD, information may be output via a transparent display provided at the windshield. Alternatively, the display unit 741 may include a projector module to output information via an image projected onto the windshield.

The sound output unit 742 is configured to convert electrical signals from the processor 170 into audio signals and to output the audio signals. To this end, the sound output unit 742 may include, for example, a speaker. The sound output unit 742 may output sound corresponding to the operation of the user input unit 724.

The haptic output unit 743 is configured to generate tactile output. For example, the haptic output unit 743 may operate to vibrate a steering wheel, a safety belt, or a seat so as to allow the user to recognize an output thereof.

The vehicle drive unit 750 may control the operation of various devices of the vehicle. The vehicle drive unit 750 may include at least one of a power source drive unit 751, a steering drive unit 752, a brake drive unit 753, a lamp drive unit 754, an air conditioner drive unit 755, a window drive unit 756, an airbag drive unit 757, a sunroof drive unit 758, and a suspension drive unit 759.

The power source drive unit 751 may perform electronic control of a power source inside the vehicle.

For example, in the case where a fossil fuel based engine (not illustrated) is a power source, the power source drive unit 751 may perform electronic control of the engine. As such, the power source drive unit 751 may control, for example, an output torque of the engine. In the case where the power source drive unit 751 is an engine, the power source drive unit 751 may control the speed of the vehicle by controlling the output torque of the engine under the control of the controller 770.

In another example, in the case where an electric motor (not illustrated) is a power source, the power source drive unit 751 may perform control of the motor. As such, the power source drive unit 751 may control, for example, the RPM and torque of the motor.

The steering drive unit 752 may perform electronic control of a steering apparatus inside the vehicle. The steering drive unit 752 may change the direction of travel of the vehicle.

The brake drive unit 753 may perform electronic control of a brake apparatus (not illustrated) inside the vehicle. For example, the brake drive unit 753 may reduce the speed of the vehicle by controlling the operation of brakes located at wheels. In another example, the brake drive unit 753 may adjust the direction of travel of the vehicle leftward or rightward by differentiating the operation of respective brakes located at left and right wheels.

The lamp drive unit 754 may turn at least one lamp arranged inside and outside the vehicle on or off. In addition, the lamp drive unit 754 may control, for example, the intensity and direction of light of each lamp. For example, the lamp drive unit 754 may perform control of a turn signal lamp or a brake lamp.

The air conditioner drive unit 755 may perform electronic control of an air conditioner (not illustrated) inside the vehicle. For example, when the interior temperature of the vehicle is high, the air conditioner drive unit 755 may operate the air conditioner to supply cold air to the interior of the vehicle.

The window drive unit 756 may perform electronic control of a window apparatus inside the vehicle. For example, the window drive unit 756 may control opening or closing of left and right windows of the vehicle.

The airbag drive unit 757 may perform the electronic control of an airbag apparatus inside the vehicle. For example, the airbag drive unit 757 may control an airbag to be deployed in a dangerous situation.

The sunroof drive unit 758 may perform electronic control of a sunroof apparatus (not illustrated) inside the vehicle. For example, the sunroof drive unit 758 may control opening or closing of a sunroof.

The suspension drive unit 759 may perform electronic control of a suspension apparatus (not shown) inside the vehicle. For example, when a road surface is uneven, the suspension drive unit 759 may control the suspension apparatus to reduce vibrations of the vehicle.

The memory 730 is electrically connected to the controller 770. The memory 730 may store basic data of the unit, control data for operation control of the unit and input/output data. The memory 730 may be various storage apparatuses, which are implemented in a hardware manner, such as a ROM, RAM, EPROM, flash drive and hard drive. The memory 730 may store a variety of data for overall operation of the vehicle, such as a program for processing or control of the controller 770.

The interface 780 may serve as a passage for various kinds of external devices that are connected to the vehicle. For example, the interface 780 may have a port that is connectable to the mobile terminal 600 and may be connected to the mobile terminal 600 via the port. In this case, the interface 780 may exchange data with the mobile terminal 600.

The interface 780 may serve as a passage for providing electric energy to the connected mobile terminal 600. When the mobile terminal 600 is electrically connected to the interface 780, the interface 780 may provide electric energy supplied from the power supply unit 790 to the mobile terminal 600 under control of the controller 770.

The controller 770 may control the overall operation of each unit inside the vehicle. The controller 770 may be referred to as an Electronic Control Unit (ECU).

The controller 770 may perform a function corresponding to the delivered signal according to delivery of a signal for executing the driver assistance apparatus 100.

The controller 770 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and electric units for the implementation of other functions.

The controller 770 may perform the role of the above-described processor 170. That is, the processor 170 of the driver assistance apparatus 100 may be directly set in the controller 770 of the vehicle. In such an embodiment, the driver assistance apparatus 100 may be understood as a combination of some components of the vehicle.

Alternatively, the controller 770 may control the components to transmit information requested by the processor 170.

The power supply unit 790 may supply power required to operate the respective components under the control of the controller 770. In particular, the power supply unit 790 may receive power from, for example, a battery (not illustrated) inside the vehicle.

The AVN apparatus 400 may exchange data with the controller 770. The controller 770 may receive navigation information from the AVN apparatus or a separate navigation apparatus. Here, the navigation information may include destination information, information on a route to the destination, map information related to vehicle traveling and current position information of the vehicle.

The above described features, configurations, effects, and the like are included in at least one of the embodiments of the present invention, and should not be limited to only one embodiment. In addition, the features, configurations, effects, and the like as illustrated in each embodiment may be implemented with regard to other embodiments as they are combined with one another or modified by those skilled in the art. Thus, content related to these combinations and modifications should be construed as including in the scope and spirit of the invention as disclosed in the accompanying claims.

Further, although the embodiments have been mainly described until now, they are just exemplary and do not limit the present invention. Thus, those skilled in the art to which the present invention pertains will know that various modifications and applications which have not been exemplified may be carried out within a range which does not deviate from the essential characteristics of the embodiments. For instance, the constituent elements described in detail in the exemplary embodiments can be modified to be carried out. Further, the differences related to such modifications and applications shall be construed to be included in the scope of the present invention specified in the attached claims.

The invention claimed is:

1. A driver assistance apparatus comprising:
    a display;
    a first camera configured to capture a first video of the vicinity of a vehicle;
    a second camera configured to capture a second video of the vicinity of the vehicle;
    a third camera configured to capture a third video of the vicinity of the vehicle; and
    a processor configured to:
        extract a first edge of a first object included in a first stitching region connecting the first video of the vicinity of the vehicle with the second video of the vicinity of the vehicle,
        extract a second edge of a second object included in a second stitching region connecting the second video of the vicinity of the vehicle with the third video of the vicinity of the vehicle,
        display a synthetic video based on the first, second and third videos of the vicinity of the vehicle without including the first and second stitching regions,
        display the first edge of the first object overlapping with a first portion corresponding to an area where the first stitching region has been excluded from the synthetic video, and
        display the second edge of the second object overlapping with a second portion corresponding to an area where the second stitching region has been excluded from the synthetic video,
    wherein the first stitching region is a fixed region included in the first video and the second video of the vicinity of the vehicle and the second stitching region is a fixed region included in the second video and the third video of the vicinity of the vehicle, and
    wherein the processor is further configured to:
    detect a preset specific object included in at least one of the first, second or third videos of the vicinity of the vehicle, and
    display a message indicating detection of the preset specific object.

2. The driver assistance apparatus of claim 1, wherein the processor is further configured to:
    calculate a first speed of the first object included in the first stitching region,
    calculate a second speed of the second object included in the second stitching region,
    calculate a first distance between the first object and the vehicle, and
    calculate a second distance between the second object and the vehicle.

3. The driver assistance apparatus of claim 2, wherein the processor is further configured to:
    display a top-view video of the vicinity of the vehicle viewed from above based on the first speed, the second speed, the first distance and the second distance.

4. The driver assistance apparatus of claim 3, wherein the processor is further configured to:
    detect a lane change operation of the vehicle, and
    in response to detecting the lane change operation, display a lane change guide message based on the first speed, the second speed, the first distance and the second distance.

5. The driver assistance apparatus of claim 4, wherein the processor detects the lane change operation of the vehicle based on a movement of a wheel of the vehicle.

6. The driver assistance apparatus of claim 4, wherein the processor detects the lane change operation of the vehicle based on a movement of a vehicle icon included in the top-view video.

7. The driver assistance apparatus of claim 4, wherein the lane change guide message is displayed based on a speed of an object located in a lane into which the vehicle is to switch into, and a distance between the vehicle and the object.

8. The driver assistance apparatus of claim 4, wherein the processor displays the lane change guide message when a distance between the vehicle and any one of the first and second objects is less than a pre-set distance.

9. The driver assistance apparatus of claim 1, wherein the first camera is a camera located at a front right side of the vehicle, the second camera is a camera located at a rear center of the vehicle, and the third camera is a camera located at a front left side of the vehicle.

10. The driver assistance apparatus of claim 1, wherein the preset specific object includes at least one of a car, a motorcycle, a bicycle, or a human.

11. The driver assistance apparatus of claim 5, wherein the top-view video includes the first speed, the second speed, the first distance and the second distance.

12. The driver assistance apparatus of claim 1, wherein the processor is further configured to:
    set an overlap region of the first video of the vicinity of the vehicle and the second video of the vicinity of the vehicle as the first stitching region.

13. The driver assistance apparatus of claim 1, wherein the processor is further configured to:
    set an overlap region of the second video of the vicinity of the vehicle and the third video of the vicinity of the vehicle as the second stitching region.

14. A method for operating a driver assistance apparatus, the method comprising:
    capturing a first video of the vicinity of a vehicle;
    capturing a second video of the vicinity of the vehicle;
    capturing a third video of the vicinity of the vehicle;
    extracting a first edge of a first object included in a first stitching region connecting the first video of the vicinity of the vehicle with the second video of the vicinity of the vehicle;
    extracting a second edge of a second object included in a second stitching region connecting the second video of the vicinity of the vehicle with the third video of the vicinity of the vehicle;
    displaying a synthetic video based on the first, second and third videos of the vicinity of the vehicle without including the first and second stitching regions;

displaying the first edge of the first object overlapping with a first portion corresponding to an area where the first stitching region has been excluded from the synthetic video; and displaying the second edge of the second object overlapping with a second portion corresponding to an area where the second stitching region has been excluded from the synthetic video, wherein the first stitching region is a fixed region included in the first video and the second video of the vicinity of the vehicle and the second stitching region is a fixed region included in the second video and the third video of the vicinity of the vehicle, and the method further comprising:

detecting a preset specific object included in at least one of the first, second or third videos of the vicinity of the vehicle; and displaying a message indicating detection of the preset specific object.

15. The method according to claim 13, further comprising:

calculating a first speed of the first object included in the first stitching region;

calculating a second speed of the second object included in the second stitching region;

calculating a first distance between the first object and the vehicle; and calculating a second distance between the second object and the vehicle.

16. The method according to claim 15, further comprising:

displaying a top-view video of the vicinity of the vehicle viewed from above based on the first speed, the second speed, the first distance and the second distance.

* * * * *